United States Patent
Jun et al.

(10) Patent No.: US 7,295,255 B2
(45) Date of Patent: Nov. 13, 2007

(54) THIN FILM TRANSISTOR ARRAY SUBSTRATE AND FABRICATING METHOD THEREOF

(75) Inventors: Jae Hong Jun, Seoul (KR); Yun Bok Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/589,185

(22) Filed: Oct. 30, 2006

(65) Prior Publication Data

US 2007/0040955 A1    Feb. 22, 2007

Related U.S. Application Data

(62) Division of application No. 10/867,809, filed on Jun. 16, 2004, now Pat. No. 7,170,576.

(51) Int. Cl.
G02F 1/1343 (2006.01)
G02F 1/1333 (2006.01)
G02F 1/1339 (2006.01)

(52) U.S. Cl. .................. 349/38; 349/39; 349/158; 349/155

(58) Field of Classification Search ........ 349/155–157, 349/38–39, 158, 110–111
See application file for complete search history.

(56) References Cited

U.S. PATENT DOCUMENTS

| | | | | |
|---|---|---|---|---|
| 5,748,266 A | * | 5/1998 | Kodate | 349/39 |
| 6,088,071 A | * | 7/2000 | Yamamoto et al. | 349/38 |
| 6,245,469 B1 | * | 6/2001 | Shiba et al. | 430/7 |
| 6,392,735 B1 | | 5/2002 | Tani | |
| 6,501,527 B1 | * | 12/2002 | Hirose et al. | 349/155 |
| 2002/0140893 A1 | | 10/2002 | Yi et al. | |

* cited by examiner

*Primary Examiner*—Mike Qi
(74) *Attorney, Agent, or Firm*—McKenna, Long & Aldridge LLP

(57) ABSTRACT

A thin film transistor array substrate having spacers formed without sacrificing an aperture ratio and a method for fabricating the same. The thin film transistor array substrate according to the present invention includes a gate line on a substrate; a gate insulating film on the gate line; a data line on the gate insulating film, the data line crossing the gate line to define a pixel region and the gate insulating film between the gate line and the data line, wherein at least one of the gate line and the data line includes a protrusion; a thin film transistor at a crossing the gate line and the data line; a pixel electrode at the pixel region, the pixel electrode connected to the thin film transistor; and a spacer within the protrusion dispensed by an ink-jet system.

9 Claims, 29 Drawing Sheets

THIN FILM TRANSISTOR ARRAY SUBSTRATE AND FABRICATING METHOD THEREOF

This application is a Divisional of prior application Ser. No. 10/867,809, filed Jun. 16, 2004, now U.S. Pat. No. 7,170,576, which claims the benefit of Korean Patent Application No. 38990/2003 filed in Korea on Jun. 17, 2003, each of which are hereby incorporated by reference in their entirety as if fully set forth herein.

BACKGROUND OF THE INVENTION

1. Field of the Invention

The present invention relates to a liquid crystal display (LCD) device and a method for fabricating the same. More particularly, the present invention relates to a thin film transistor array substrate having spacers formed without sacrificing an aperture ratio.

2. Discussion of the Related Art

Generally, liquid crystal displays (LCDs) control light transmittance of liquid crystal material by using an electric field to display a picture. The liquid crystal display, in which a common electrode formed on an upper substrate and a pixel electrode formed on a lower substrate are arranged with the two electrodes facing each other, drives a liquid crystal by an electric field formed between the common electrode and the pixel electrode.

The liquid crystal display has a thin film transistor array substrate (a lower substrate) and a color filter array substrate (an upper substrate) with the two substrates facing each other and being bonded together, spacers for uniformly maintaining a cell gap between the two substrates and a liquid crystal in the space provided by the spacers.

The thin film transistor array substrate includes a plurality of signal lines, a plurality of thin film transistors, and an alignment film applied for a liquid crystal alignment thereon. The color filter array substrate includes a color filter for representing colors, a black matrix for preventing a light leakage and an alignment film applied for a liquid crystal alignment thereon.

The spacers are classified into ball spacers formed by a scattering method and pattern spacers formed by a photolithography technique.

The ball spacers are scattered on a substrate using a scatter to maintain the cell gap between the upper and lower substrates. However, it is difficult to uniformly scatter the ball spacers. Further, the ball spacers move around between the upper and lower substrates, which results in a ripple phenomenon.

The pattern spacers are formed on a substrate with a pattern by a photolithography technique such that they are fixed at a specific location to maintain the cell gap between the upper and lower substrates. However, because the pattern spacers are formed by the photolithography technique, an additional mask process is required. Moreover, when forming the pattern spacers by a photolithography technique, only a small fraction of the spacer material is actually used to form the pattern spacers, and most of the spacer material, more than 95%, is removed from the substrate, thereby increasing the production cost.

In order to solve these problems, a thin film transistor array substrate having spacers formed by an ink-jet device has been suggested.

FIG. 1 is a plan view illustrating a related art thin film transistor array substrate in which spacers are formed by an ink-jet device, and FIG. 2 is a sectional view illustrating the thin film transistor array substrate taken along the line I-I' in FIG. 1.

Referring to FIGS. 1 and 2, the related art thin film transistor array substrate includes a gate line 2 and a data line 4 formed on a lower substrate 1 in such a manner to cross each other, a thin film transistor 30 formed at each crossing, a pixel electrode 22 in a pixel region 34 defined by the crossing, a storage capacitor 28 formed at an overlap between the gate line 2 and a storage electrode 24, and a spacer 32 overlapping the storage capacitor 28.

The gate line 2 supplies a gate signal to a gate electrode 6 of the thin film transistor 30. The gate line is formed to have a first width W1 at an area where the gate line 2 and the data line 4 overlap each other with a gate insulating film 12 therebetween, and is formed to have a second width W2, which is wider than the first width W1, at an area between the pixel electrodes 22. That is, the gate line 2 has a relatively narrow width at an area that is overlapped with the data line 4. Thus, the signal interference caused by a coupling between a pixel signal supplied to the data line 4 and a gate signal supplied to the gate line 2 can be reduced.

The data line 4 is formed to have a third width W3 and supplies a pixel signal to the pixel electrode 22 via a drain electrode 10 of the thin film transistor 30.

The thin film transistor 30, in response to the gate signal of the gate line 2, charges the pixel signal of the data line 4 to the pixel electrode 22. To this end, the thin film transistor 30 includes the gate electrode 6 connected to the gate line 2, a source electrode 8 connected to the data line 4, and a drain electrode 10 connected to the pixel electrode 22. The thin film transistor 30 further includes an active layer 14 overlapping the gate electrode 6 with the gate insulating film 12 therebetween and defining a channel between the source electrode 8 and the drain electrode 10. On the active layer 14 is an ohmic contact layer 16 for making an ohmic contact with the source electrode 8 and the drain electrode 10.

The pixel electrode 22, which is connected to the drain electrode 10 of the thin film transistor 30 via a first contact hole 20a passing through a passivation film 18, is formed in the pixel region 34.

Accordingly, an electric field is formed between the pixel electrode 22 to which the pixel signal is supplied via the thin film transistor 30 and the common electrode (not shown) to which a reference voltage is supplied. When such an electric field is applied, the liquid crystal molecules arranged in a predetermined direction between the thin film transistor array substrate and the color filter array substrate rotate due to a dielectric anisotropy of the liquid crystal molecules. As a result, the light transmittance at the pixel region 34 differs in accordance with an amount of the rotation of the liquid crystal molecules, and thereby pictures can be displayed.

The storage capacitor 28 includes the gate line 2, the storage electrode 24 overlapping the gate line 2 with the gate insulating film 12 therebetween, and the pixel electrode 22 connected, via a second contact hole 20b passing through the passivation film 18, to the storage electrode 24. The storage capacitor 28 allows a pixel signal charged in the pixel electrode 22 to be stably maintained until the next pixel signal is charged.

The spacer 32 maintains a cell gap between the thin film transistor array substrate and the color filter array substrate. The spacer 32 is formed by an ink-jet device at a region of the thin film transistor array substrate that is overlapped with a black matrix (not shown) of the color filter array substrate.

That is, the spacer 32 is formed to overlap the TFT 30 or the storage capacitor 28 formed on the thin film transistor array substrate.

A method of fabricating the spacer 32 with an ink-jet device will be explained in detail in conjunction with FIGS. 3A to 3C.

As shown in FIG. 3A, an ink-jet device 40 is aligned on the lower substrate 1. A spacer material 33 is then dispensed on the TFT 30 or the storage capacitor 28 of the lower substrate 1 using the aligned ink-jet device 40, as shown in FIG. 3B. That is, when a voltage is applied to a piezoelectric element of an ink-jet head 44, a physical pressure is generated. This physical pressure causes a conduit employed to connect the tank 42 containing the spacer material 33 with a nozzle 46 to contract and relax repeatedly so that the spacer material 33 is dispensed on the lower substrate 1 through the nozzle 46.

The spacer material 33 dispensed on the lower substrate 1 through the nozzle 46 of ink-jet device 40 thereafter undergoes an exposure to a ultraviolet ray radiated from a light source 48 or a firing process as shown in FIG. 3C. In this way, the spacer 32 is fixed on the lower substrate 1 with a predetermined width W and height H.

During the formation of the spacer 32 using the ink-jet device in accordance with the related art, the spacer material 33 of low viscosity experiences the gravity via the nozzle while being dispensed on the substrate 1. Accordingly, the spacer material 33 becomes spread out widely, making it difficult for the spacer 32 to locate at a predetermined position. In other words, the spacer 32 has to be formed at areas on the lower substrate that can be covered by the black matrix of the upper substrate in order not to sacrifice the aperture ratio of the LCD, with those areas including the TFT 30, the storage capacitor 28, the data line 4, and the gate line 2. With the spacer 32 being spread out, the spacer 32 is undesirably formed on the pixel electrode, which is a non-overlapping area with the black matrix, thereby sacrificing the aperture ratio, and the spacer 32 appear as a stain on the pixel electrode 22.

SUMMARY OF THE INVENTION

Accordingly, the present invention is directed to a thin film transistor array substrate and a method for fabricating the same that substantially obviates one or more of the problems due to limitations and disadvantages of the related art.

An advantage of the present invention is to provide a thin film transistor array substrate having spacers formed without sacrificing an aperture ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a thin film transistor array substrate may, for example, include a gate line on a substrate; a gate insulating film on the gate line; a data line on the gate insulating film, the data line crossing the gate line to define a pixel region and the gate insulating film between the gate line and the data line, wherein at least one of the gate line and the data line includes a protrusion; a thin film transistor at a crossing the gate line and the data line; a pixel electrode at the pixel region, the pixel electrode connected to the thin film transistor; and a spacer within the protrusion dispensed by an ink-jet system.

In another aspect of the present invention, a method of fabricating a thin film transistor array substrate may, for example, include forming a gate line on a substrate; forming a gate insulating film on the gate line; forming a data line on the gate insulating film, the data line crossing the gate line to define a pixel region and the gate insulating film between the gate line and the data line, wherein at least one of the gate line and the data line includes a protrusion; forming a thin film transistor at a crossing of the gate line and the data line; forming a pixel electrode at the pixel region, the pixel electrode connected to the thin film transistor; and forming a spacer within the protrusion by an ink-jet system.

In yet another aspect of the present invention, a method of fabricating a liquid crystal display device may, for example, include forming a gate line on a lower substrate; forming a data line crossing the gate line to define a pixel region, wherein at least one of the data line and the gate line has a protrusion; forming a thin film transistor at a crossing of the gate line and the data line, the thin film transistor including a source electrode, a drain electrode and a gate electrode; forming a pixel electrode at the pixel region, the pixel electrode connected to the drain electrode of the thin film transistor; and forming a spacer within the protrusion by a dispenser.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
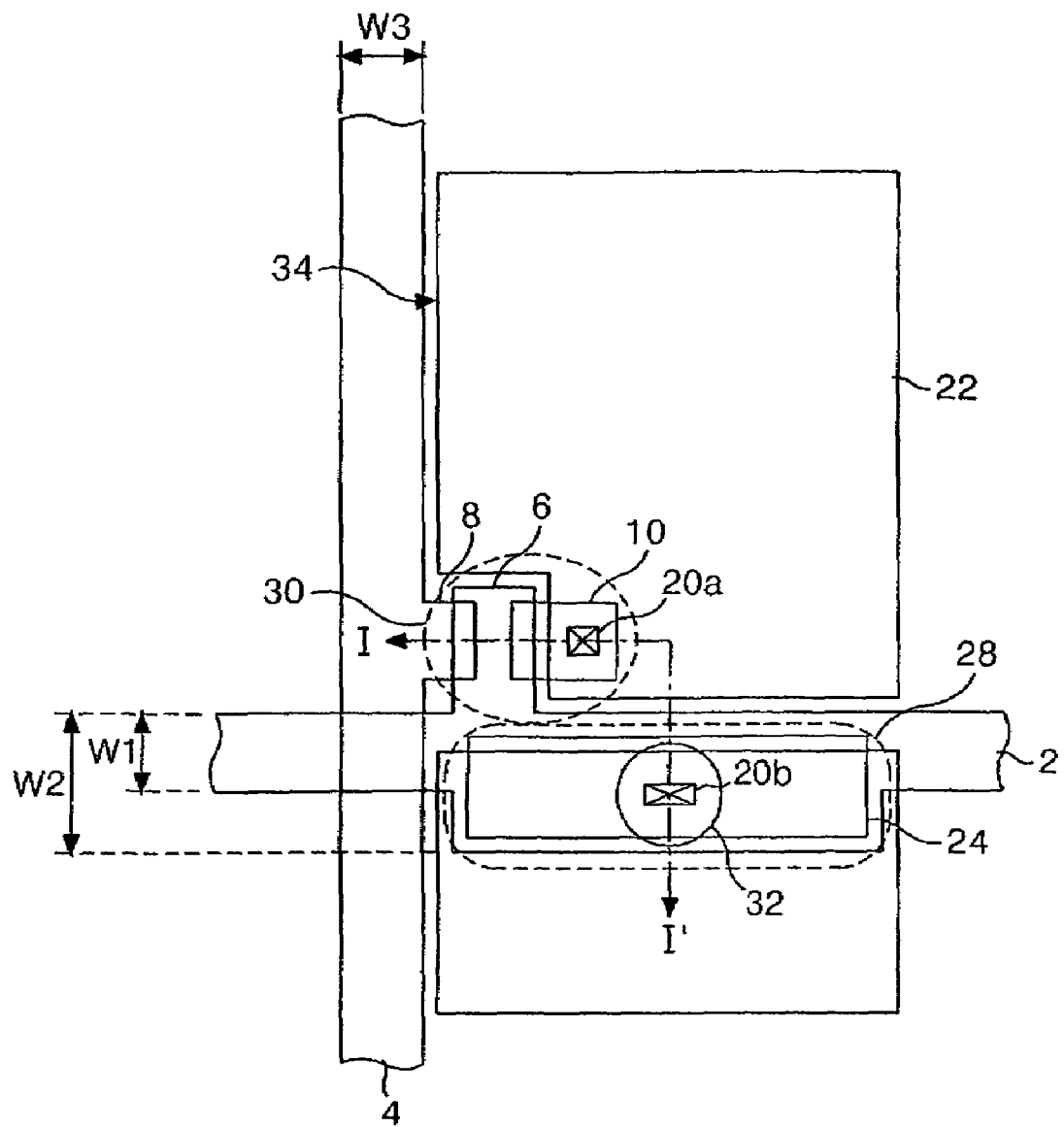
FIG. 1 is a plan view illustrating a thin film transistor array substrate in accordance with a related art.
Figure 2:
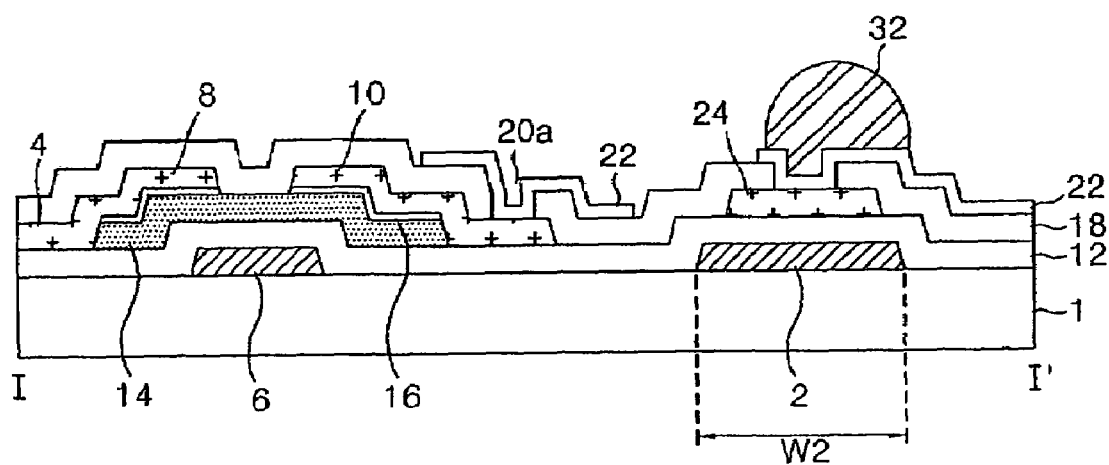
FIG. 2 is a sectional view of the thin film transistor array substrate taken along the line I-I' in FIG. 1.
Figure 3A:
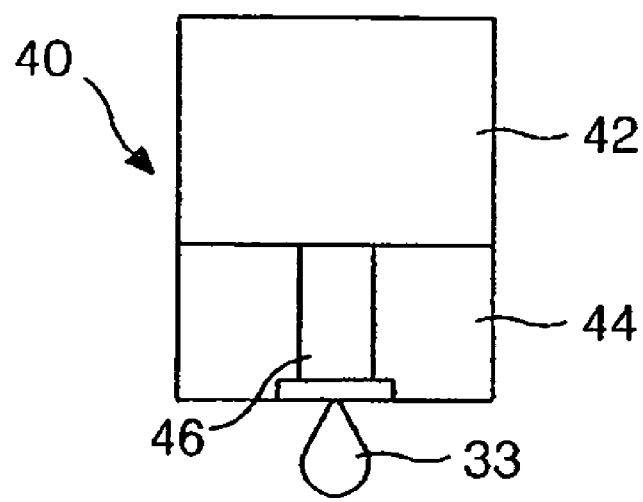
FIGS. 3A to 3C are sectional views illustrating a fabricating process of the spacer formed by a related art ink-jet system.
Figure 3A:
Figure 3B:
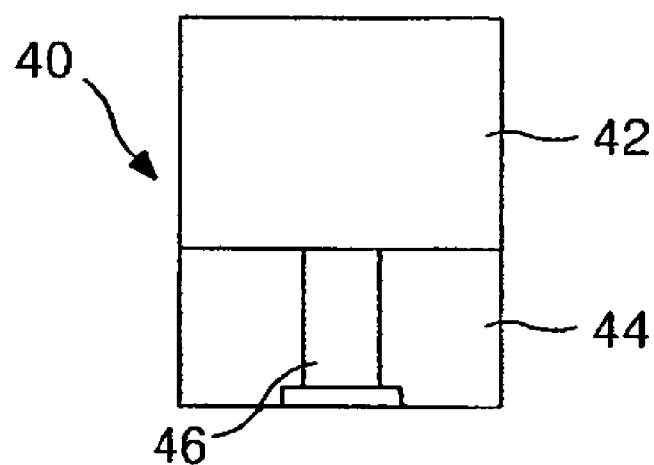
Figure 3B:
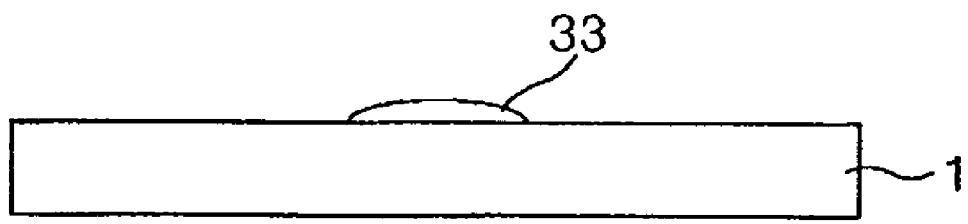
Figure 3C:
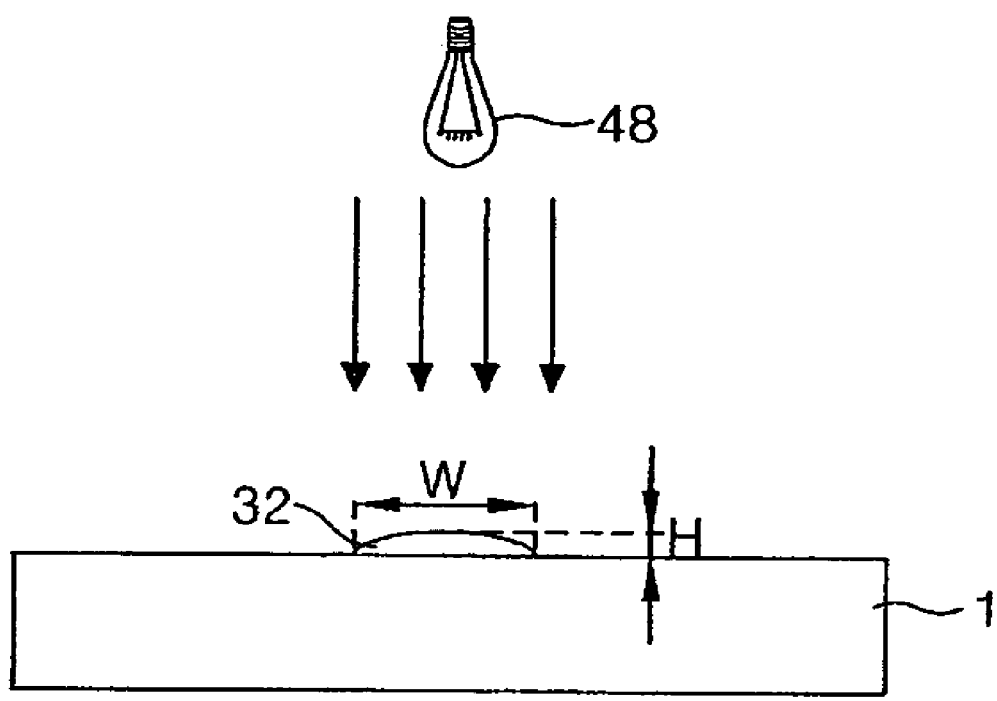
Figure 4:
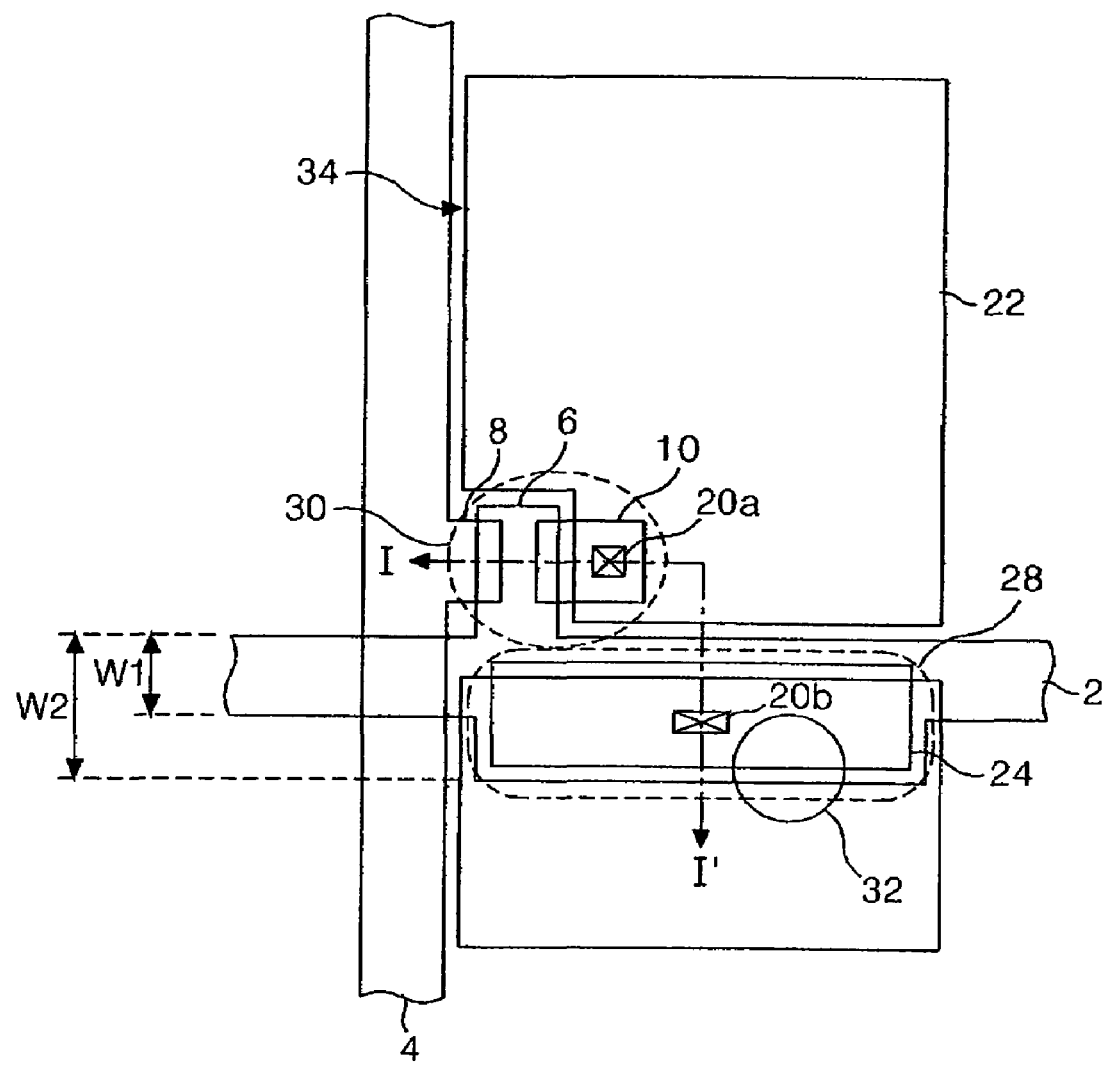
FIG. 4 is a plan view illustrating a spacer formed on the pixel electrode unshielded by a black matrix.
Figure 5:
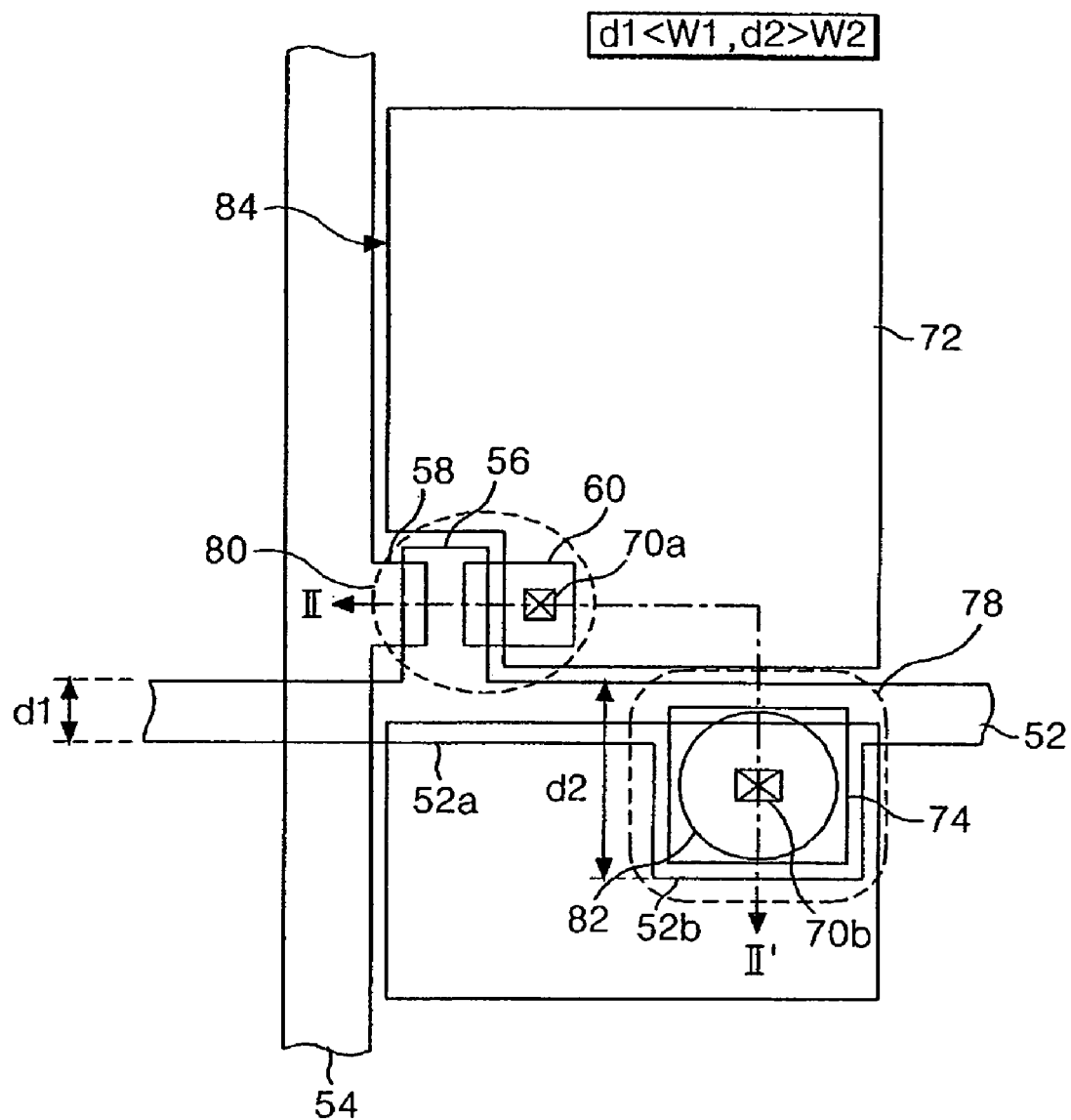
FIG. 5 is a plan view illustrating a thin film transistor array substrate according to a first embodiment of the present invention.
Figure 6:
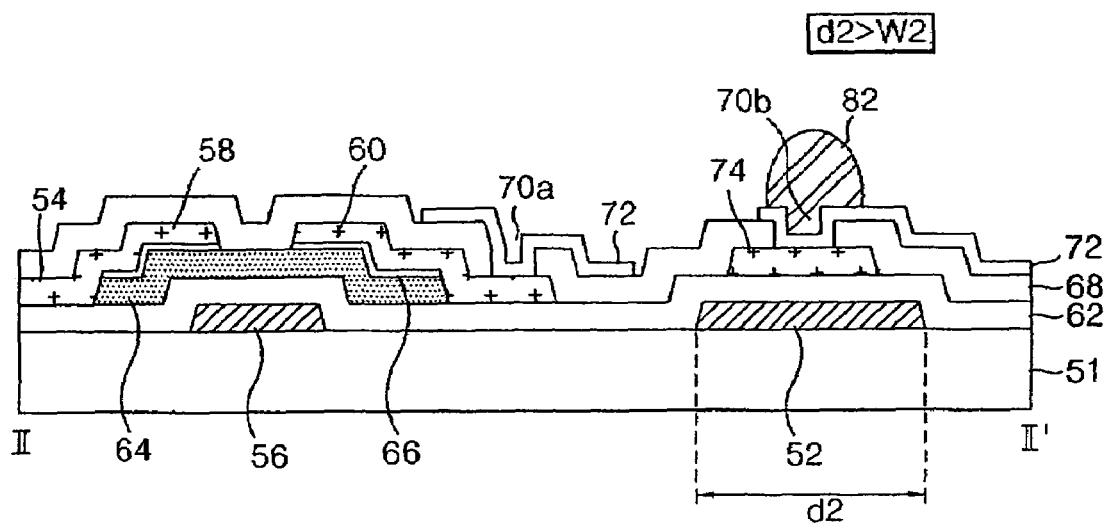
FIG. 6 is a sectional view of the thin film transistor array substrate taken along the line H-H' in FIG. 5.

FIG. 5 is a plan view illustrating a thin film transistor array substrate according to a first embodiment of the present invention, and FIG. 6 is a sectional view of the thin film transistor array substrate taken along the line II-II' in FIG. 5.

Referring to FIGS. 5 and 6, the thin film transistor array substrate according to the first embodiment of the present invention includes a gate line 52 having different widths and a data line 54 crossing the gate line 52 on a lower substrate, with a gate insulating film 62 therebetween. The thin film transistor array substrate further includes a thin film transistor 80 formed at each crossing, a pixel electrode 72 in a pixel region 84 defined by the crossing, a storage capacitor 78 formed at an overlap between the gate line 52 and a storage electrode 74, and a spacer 82 formed to overlap the storage capacitor 78.

Figure 7:
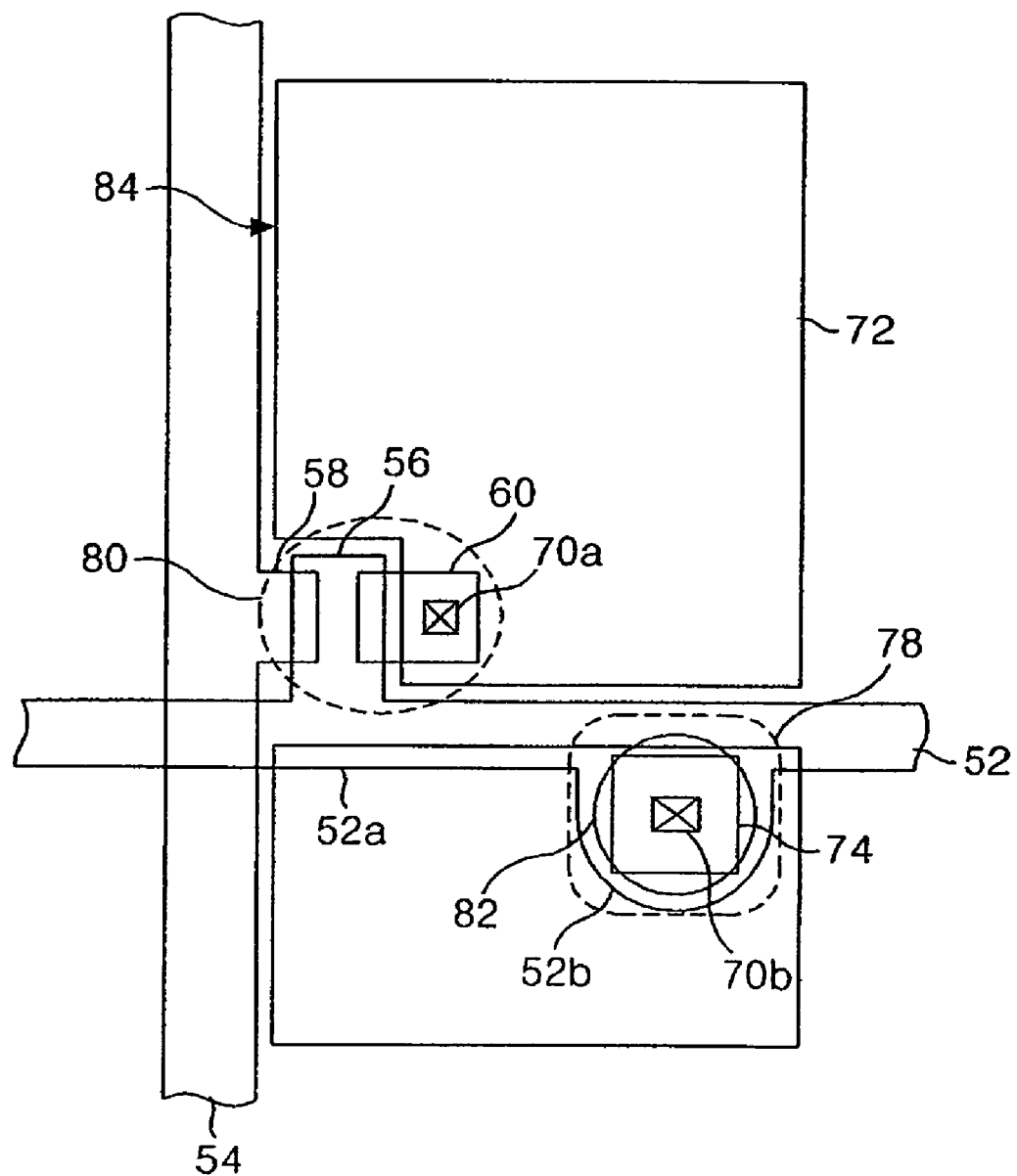
FIG. 7 is a plan view illustrating another type of the thin film transistor array substrate shown in FIG. 5.

The gate line 52 supplies a gate signal to a gate electrode 56 of the thin film transistor 80. The gate line 52 includes a line part 52a defining a pixel region 84 and a protrusion 52b protruded from the line part 52a. The line part 52a is formed to have a width d1, which is narrower than the first width W1 of the gate line in the related art, to compensate the decreased aperture ratio of the pixel electrode 72 due to the protrusion 52b. The protrusion 52b has a width d2 wider than the line part 52a in which the spacer 82 overlapping the storage electrode 74 is formed by an ink-jet device. According to the first embodiment of the present invention, the protrusion 52b, for example, has a vertical width of about 30 μm-50 μm parallel to the data line 54 and a horizontal width of about 30 μm-50 μm perpendicular to the data line 54. The protrusion 52b may have a rectangular shape with a width greater than a diameter of the spacer 82 as shown in FIG. 5, or may have a circular shape with a diameter greater than a diameter of the spacer 82 as shown in FIG. 7.

The data line 54 supplies a pixel signal via a drain electrode 60 of the thin film transistor 80 to the pixel electrode 72.

The thin film transistor 80, in response to a gate signal of the gate line 52, charges the pixel signal of the data line 54 to the pixel electrode 72. To this end, the thin film transistor 80 includes the gate electrode 56 connected to the gate line 52, a source electrode 58 connected to the data line 54, and a drain electrode 60 connected to the pixel electrode 72. In addition, the thin film transistor 80 further includes an active layer 64 overlapping the gate electrode 56 with the gate insulating film 62 therebetween and defining a channel between the source electrode 58 and the drain electrode 60. On the active layer 64 is an ohmic contact layer 66 for making an ohmic contact with the source electrode 58 and the drain electrode 60.

The pixel electrode 72, which is connected to the drain electrode 60 of the thin film transistor 80 via a first contact hole 70a passing through a passivation film 68, is formed in the pixel region 84.

Accordingly, an electric field is formed between the pixel electrode 72 to which the pixel signal is supplied via the thin film transistor 80 and the common electrode (not shown) to which a reference voltage is supplied. When such an electric field is applied, the liquid crystal molecules arranged in a predetermined direction between the thin film transistor array substrate and the color filter array substrate rotate due to a dielectric anisotropy of the liquid crystal molecules. As a result, the light transmittance at the pixel region 84 differs in accordance with an amount of the rotation of the liquid crystal molecules, and thereby pictures can be displayed.

The storage capacitor 78 includes the gate line 52, the storage electrode 74 overlapping the gate line 52 with the gate insulating film 62 therebetween, and the pixel electrode 72 connected, via a second contact hole 70b passing through the passivation film 68, to the storage electrode 74. Herein, the storage electrode 74 is overlapped with the protrusion 52b of the gate line 52, with the gate insulating film 62 therebetween. The storage electrode 74 that is accord with the principles of the present invention may be partially overlapped with both of the line part 52a and the protrusion 52b of the gate line 52 so that it may be formed as a "T" shape in order to enlarge the capacitance of the storage capacitor 78. The storage capacitor 78 allows a pixel signal charged in the pixel electrode 72 to be stably maintained until the next pixel signal is charged.

The spacer 82 maintains a cell gap between the thin film transistor array substrate and the color filter array substrate. The spacer 82 that is in accord with the principles of the present invention may be formed to have a semi-circle or semi-oval shape at a protrusion region of the gate line 52 by an ink-jet device, with the spacer 82 being overlapped with a black matrix (not shown) of the color filter array substrate. That is, the spacer 82 is formed to overlap the storage capacitor 78.

FIGS. 8A to 8F are plan views and sectional views illustrating a fabricating process of the thin film transistor array substrate according to the first embodiment of the present invention shown in FIGS. 5 and 6.

Figure 8A:
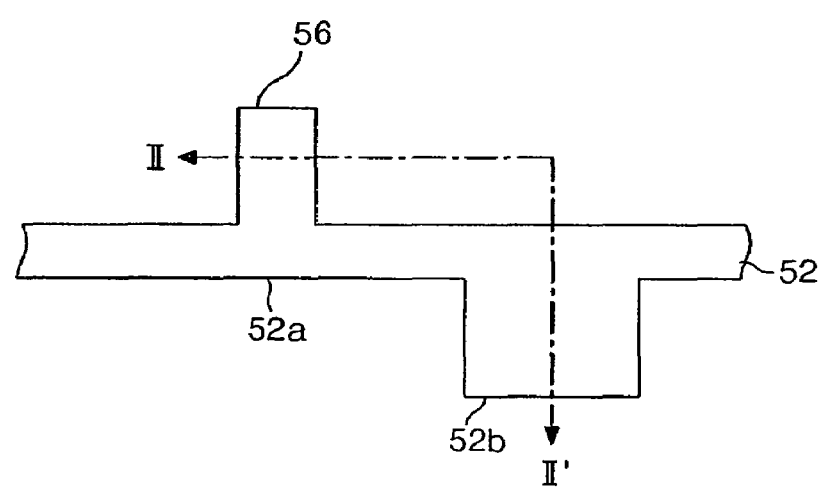
FIGS. 8A to 8F are plan views and sectional views illustrating a fabricating process of the thin film transistor array substrate shown in FIGS. 5 and 6.
Figure 8A:
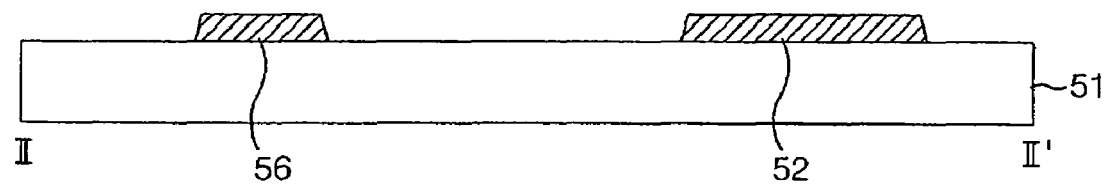

Referring to FIG. 8A, a first conductive pattern group including the gate line 52 and the gate electrode 56 is formed on a lower substrate 51 with a first mask process. More specifically, a gate metal layer is formed on the lower substrate 51 by a deposition technique such as a sputtering method. The gate metal layer is made of a metal such as aluminum (Al), an aluminum alloy, molybdenum (Mo) and copper (Cu). The gate metal layer is then patterned by a photolithography process including an etching process, to thereby form the first conductive pattern group including the gate line 52 having the line part 52a and the protrusion 52b and the gate electrode 56.

Figure 8B:
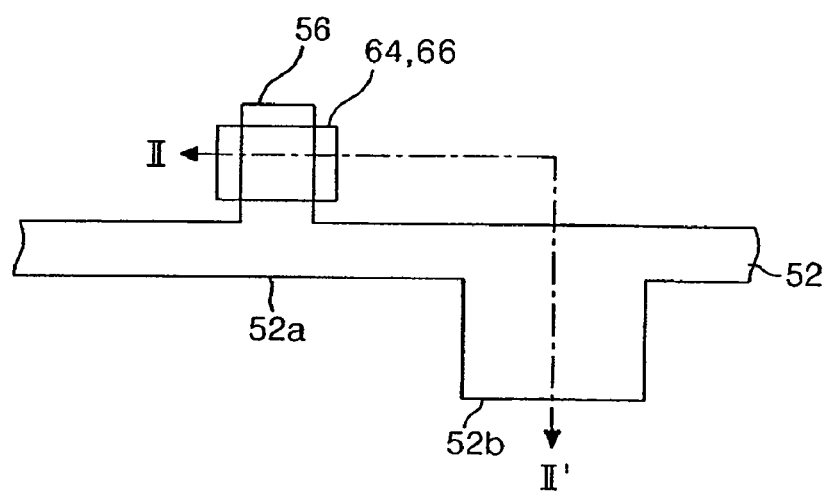
Figure 8B:
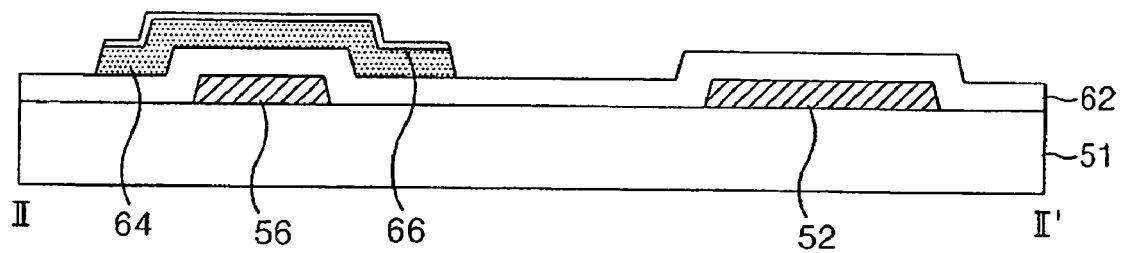

Referring to FIG. 8B, a gate insulating film 62 and a semiconductor pattern including an active layer 64 and an ohmic contact layer 66 are formed with a second mask process on the lower substrate 51 having the first conductive pattern group. More specifically, the gate insulating film 62 is formed on the lower substrate 51 having the first conductive pattern group by deposition techniques such as a plasma enhanced chemical vapor deposition (PECVD) method and a sputtering method. The gate insulating film 62 is made of an inorganic insulating material such as silicon oxide ($SiO_x$) or silicon nitride ($SiN_x$). A first semiconductor layer and a second semiconductor are sequentially formed on the lower substrate 51 having the gate insulating film 62 by deposition techniques such as a plasma enhanced chemical vapor deposition (PECVD) method. Herein, the first semiconductor layer is made of amorphous silicon in which an impurity is not doped, and the second conductor layer is made of amorphous silicon in which an impurity of a N-type or P-type is doped. Then, the first and the second semiconductor layers are patterned by a photolithography process including a dry-etching process, to thereby form the semiconductor pattern including the active layer 64 and the ohmic contact layer 66.

Figure 8C:
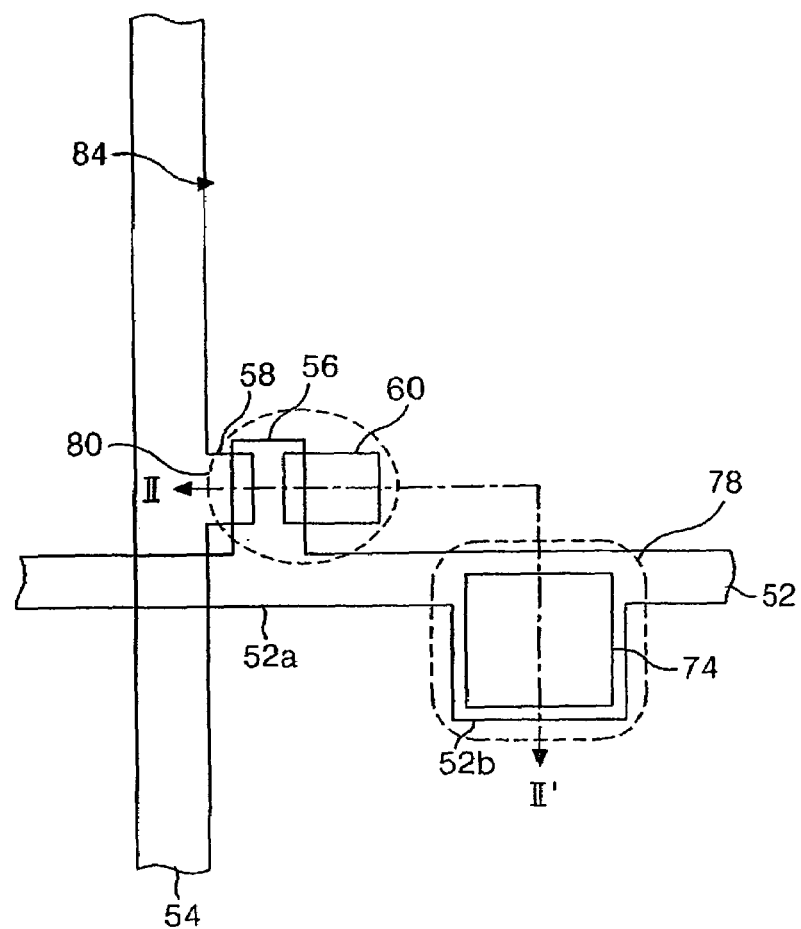
Figure 8C:
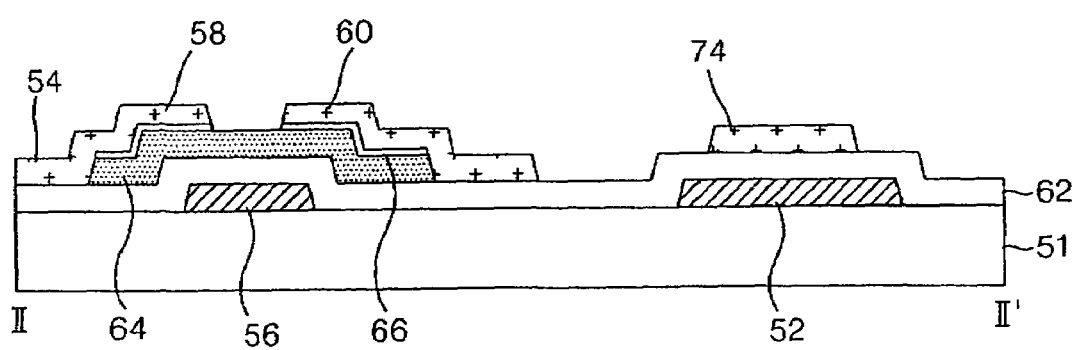

Referring to FIG. 8C, a second conductive pattern group is formed with a third mask process on the lower substrate 51 having the semiconductor pattern. More specifically, a source/drain metal layer is deposited by a deposition technique such as a sputtering method on the gate insulating film 62 on which the semiconductor pattern is formed. Herein, the source/drain metal layer is made of chrome (Cr), molybdenum (Mo) and copper (Cu). Then, the source/drain metal layer is patterned by a photolithography process such as an etching process, to thereby form the second conductive pattern group including the data line 54, the storage electrode 74, the source electrode 58 and the drain electrode 60. Thereafter, the ohmic contact layer 66 at a channel portion of the thin film transistor is removed by a dry-etching process using the source electrode 58 and the drain electrode 60 as a mask, to thereby expose the active layer 64.

Figure 8D:
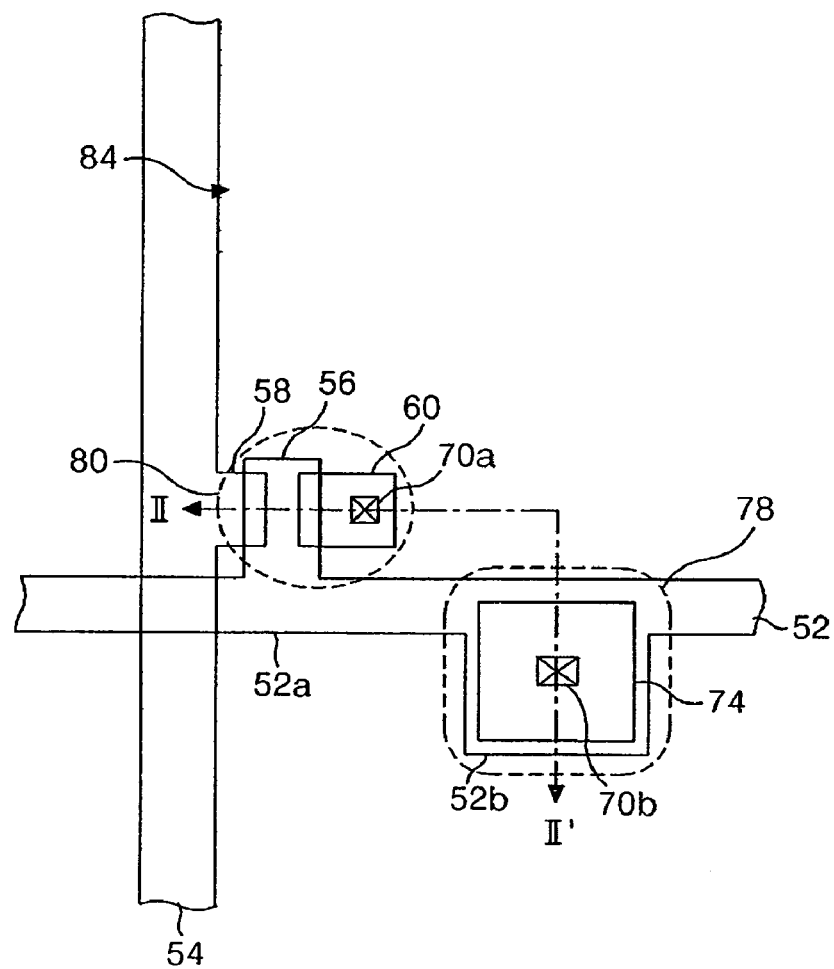
Figure 8D:
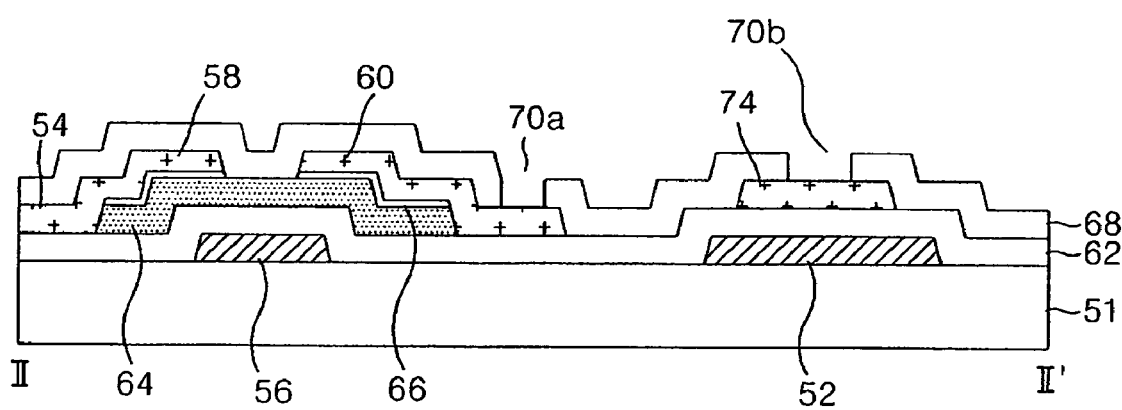

Referring to FIG. 8D, a passivation film 68 including first and second contact holes 70a and 70b is formed on the lower substrate 51 having the second conductive pattern group with a fourth mask process. More specifically, the passivation film 68 is formed on the gate insulating film 62. The passivation film 68 is made of an inorganic insulating material such as a material used for the gate insulating film 62 or an organic insulating material having a small dielectric constant such as an acrylic organic compound, BCB (benzocyclobutene) or PFCB (perfluorocyclobutane), etc. The passivation film 68 is patterned by a photolithography process including a dry-etching process, to thereby form the first and the second contact holes 70a and 70b. The first contact hole 70a is formed in such a manner to pass through the passivation film 68 to expose the drain electrode 60, whereas the second contact hole 70b is formed in such a manner to pass through the passivation film 68 to expose the storage electrode 74.

Figure 8E:
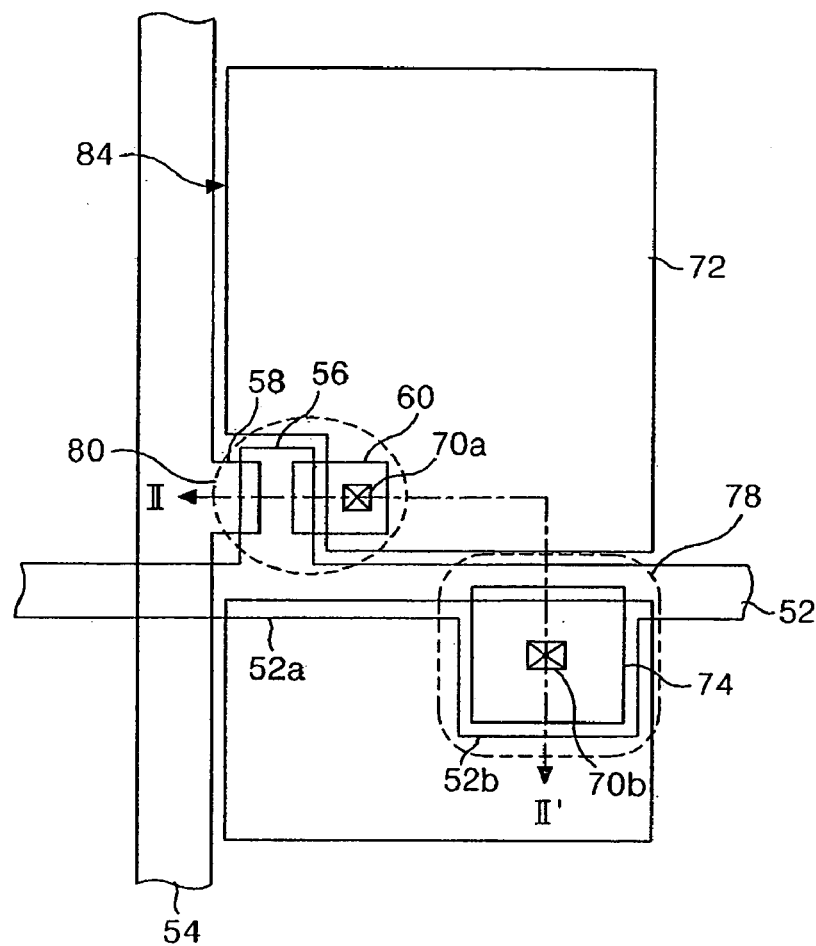
Figure 8E:
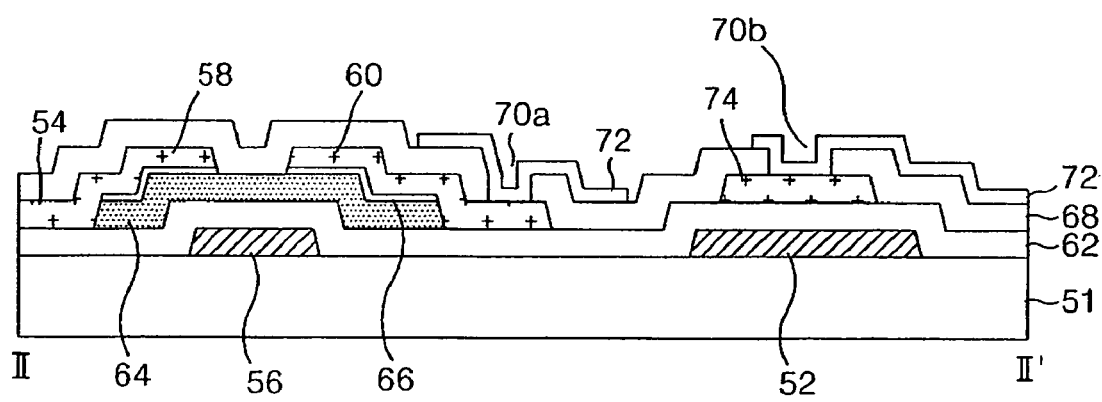

Referring to FIG. 8E, a third conductive pattern group is formed on the lower substrate 51 having the passivation film 68 with a fifth mask process. More specifically, a transparent conductive film is formed on the passivation film 68 by a deposition technique such as a sputtering method. The transparent conductive film may be made of indium-tin-oxide (ITO), tin-oxide (TO), indium-zinc-oxide (IZO) or indium tin zinc oxide (ITZO). The transparent conductive film is then patterned by a photolithography process to form the pixel electrode 72. The pixel electrode 72 is connected to the drain electrode 60 via the first contact hole 70a, and is also connected to the storage electrode 74 via the second contact hole 70b.

Figure 8F:
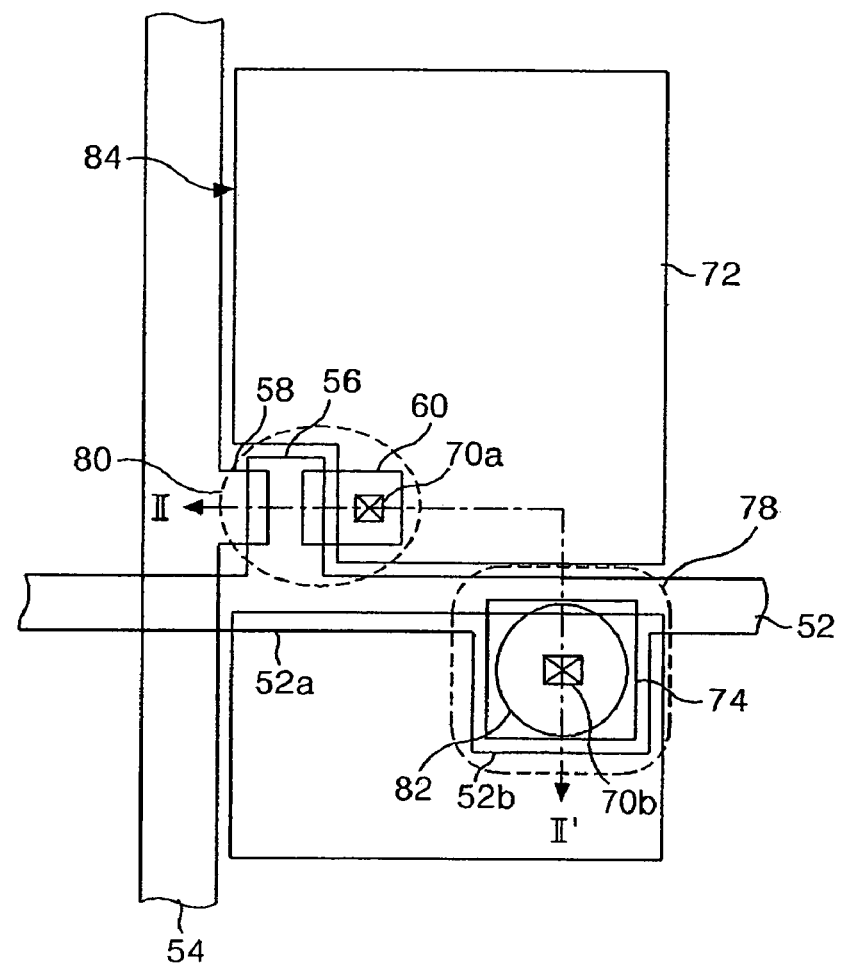
Figure 8F:
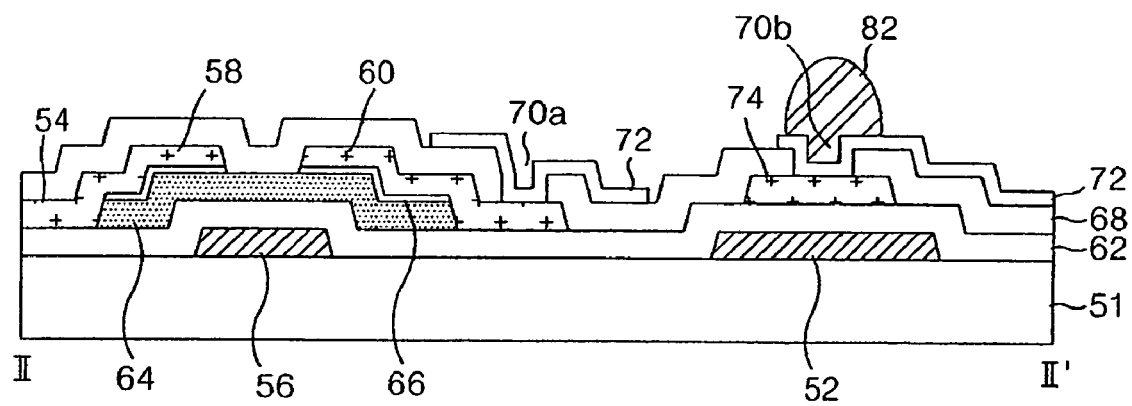

Referring to FIG. 8F, a spacer 82 is formed on the lower substrate 51 having the pixel electrode 72. More specifically, a spacer material is formed by an ink-jet system on the pixel electrode 72 overlapped with the protrusion 52b of the gate line 52. Then, the spacer material is cured by a ultraviolet ray or a firing process, so that the spacer 82 having a predetermined height and width to overlap the protrusion 52b of the gate line 52 is formed.

Figure 9:
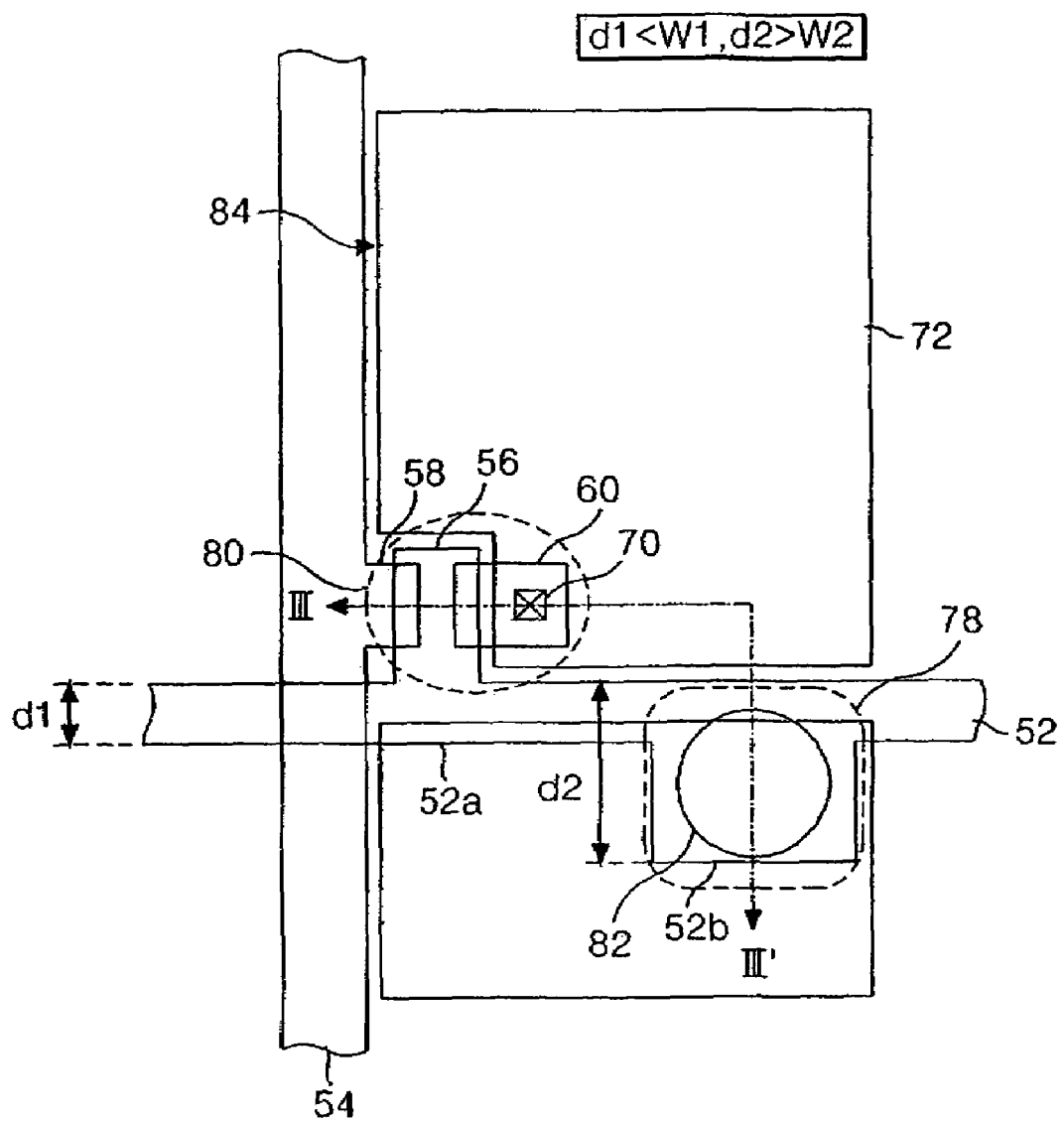
FIG. 9 is a plan view illustrating a thin film transistor array substrate according to a second embodiment of the present invention.
Figure 10:
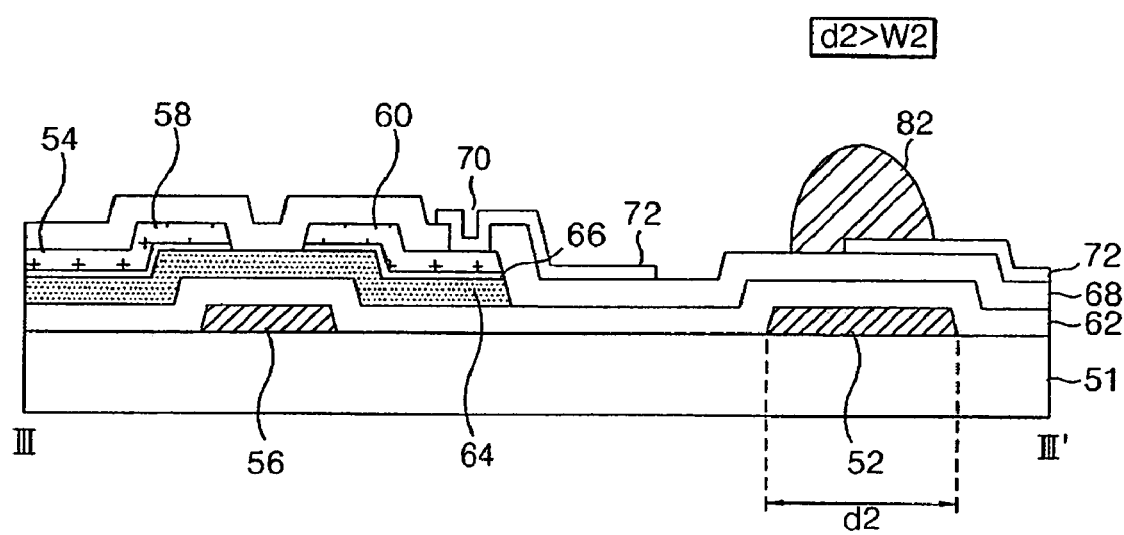
FIG. 10 is a sectional view of the thin film transistor array substrate taken along the line III-III' in FIG. 9.

FIG. 9 is a plan view illustrating a thin film transistor array substrate according to a second embodiment of the present invention, and FIG. 10 is a sectional view of the thin film transistor array substrate taken along the line III-III' in FIG. 9.

Referring to FIGS. 9 and 10, the thin film transistor array substrate, on a lower substrate 51, includes a gate line 52 having different widths and a data line 54 crossing the gate line 52, with a gate insulating film 62 therebetween. The thin film transistor array substrate further includes a thin film transistor 80 formed at each crossing, a pixel electrode 72 in a pixel region 84 defined by the crossing, a storage capacitor 78 formed at an overlap between the gate line 52 and a storage electrode 74, and a spacer 82 formed to overlap the gate line 52.

Figure 11:
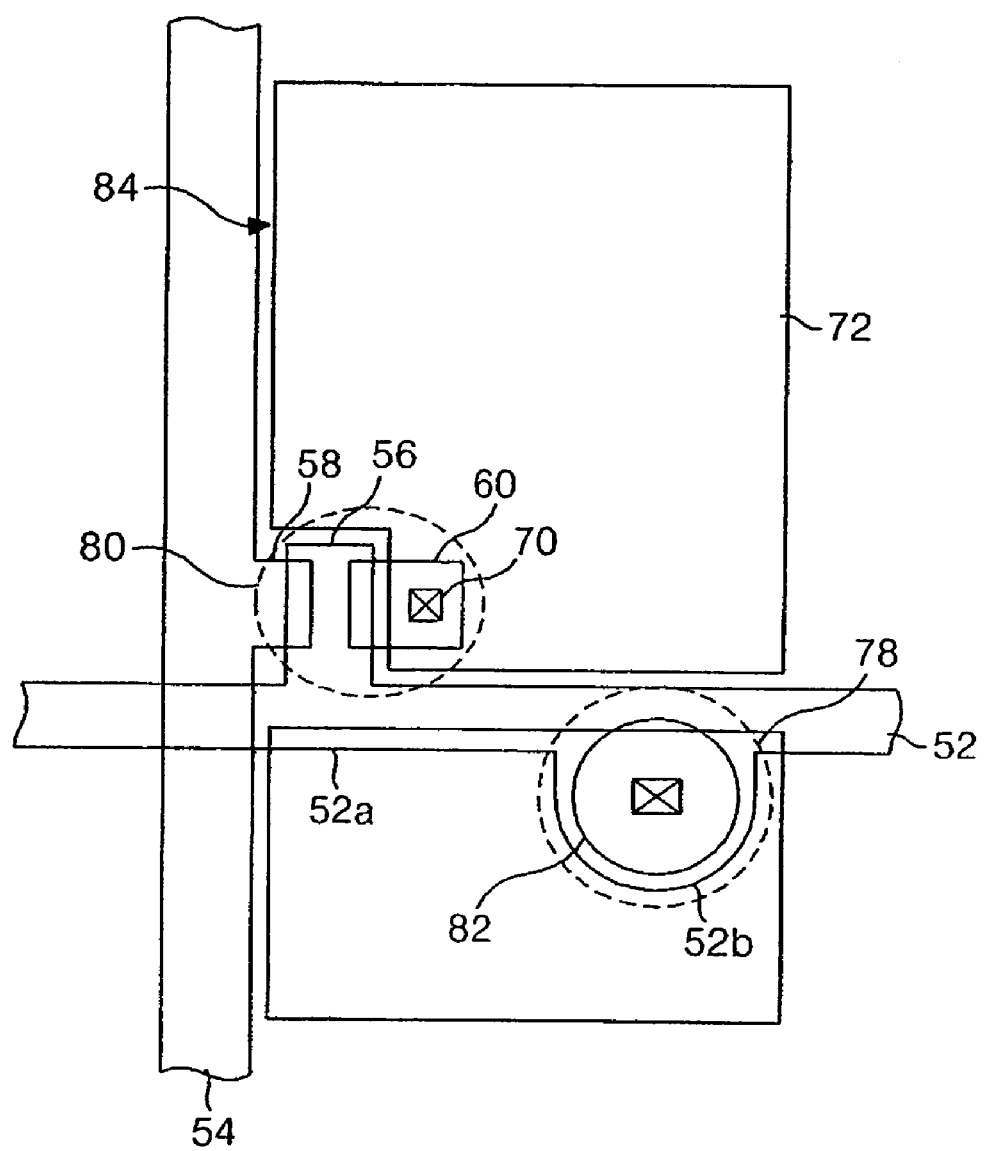
FIG. 11 is a plan view illustrating another type of the thin film transistor array substrate shown in FIG. 9.

The gate line 52 supplies a gate signal to a gate electrode 56 of the thin film transistor 80. The gate line 52 includes a line part 52a defining a pixel region 84 and a protrusion 52b protruded from the line part 52a. The line part 52a is formed to have a width d1, which is narrower than the first width W1 of the gate line in the related art, to compensate the decreased aperture ratio of the pixel electrode 72 due to the protrusion 52b. The protrusion 52b has a width d2 wider than the line part 52a in which the spacer 82 overlapping the storage electrode 74 is formed by an ink-jet device. According to the second embodiment of the present invention, the protrusion 52b, for example, has a vertical width of about 30 μm-50 μm parallel to the data line 54 and a horizontal width of about 30 μm-50 μm perpendicular to the data line 54. The protrusion 52b may have a rectangular shape with a width greater than a diameter of the spacer 82 as shown in FIG. 9, or may have a circular shape with a diameter greater than a diameter of the spacer 82 as shown in FIG. 11.

The data line 54 supplies a pixel signal via a drain electrode 60 of the thin film transistor 80 to the pixel electrode 72.

The thin film transistor 80, in response to a gate signal of the gate line 52, charges the pixel signal of the data line 54 to the pixel electrode 72. To this end, the thin film transistor 80 includes the gate electrode 56 connected to the gate line 52, a source electrode 58 connected to the data line 54 and a drain electrode 60 connected to the pixel electrode 72. In addition, the thin film transistor 80 further includes an active layer 64 overlapping the gate electrode 56 with the gate insulating film 62 therebetween and defining a channel between the source electrode 58 and the drain electrode 60. On the active layer 64 is an ohmic contact layer 66 for making an ohmic contact with the source electrode 58 and the drain electrode 60.

The pixel electrode 72, which is connected to the drain electrode 60 of the thin film transistor 80, via a first contact hole 70 passing through a passivation film 68, is formed in the pixel region 84.

Accordingly, an electric field is formed between the pixel electrode 72 to which the pixel signal is supplied via the thin film transistor 80 and the common electrode (not shown) to which a reference voltage is supplied. When such an electric field is applied, the liquid crystal molecules arranged in a predetermined direction between the thin film transistor array substrate and the color filter array substrate rotate due to a dielectric anisotropy of the liquid crystal molecules. As a result, the light transmittance at the pixel region 84 differs in accordance with an amount of the rotation of the liquid crystal molecules, and thereby pictures can be displayed.

The storage capacitor 78 includes a protrusion 52b of the gate line 52 and a pixel electrode 72 overlapping the protrusion 52b of the gate line 52, with the gate insulating film 62 and the passivation film 68 therebetween. The storage capacitor 78 allows a pixel signal charged in the pixel electrode 72 to be stably maintained until the next pixel signal is charged.

The spacer 82 maintains a cell gap between the thin film transistor array substrate and the color filter array substrate. The spacer 82 that is in accord with the principles of the present invention may be formed to have a semi-circle shape or semi-oval shape at a protrusion region of the gate line 52 by an ink-jet device, with the spacer 82 being overlapped with a black matrix (not shown) of the color filter array substrate. That is, the spacer 82 is formed to overlap the storage capacitor 78.

FIGS. 12A to 12E are plan views and sectional views illustrating a fabricating process of the thin film transistor array substrate shown in FIGS. 9 and 10.

Figure 12A:
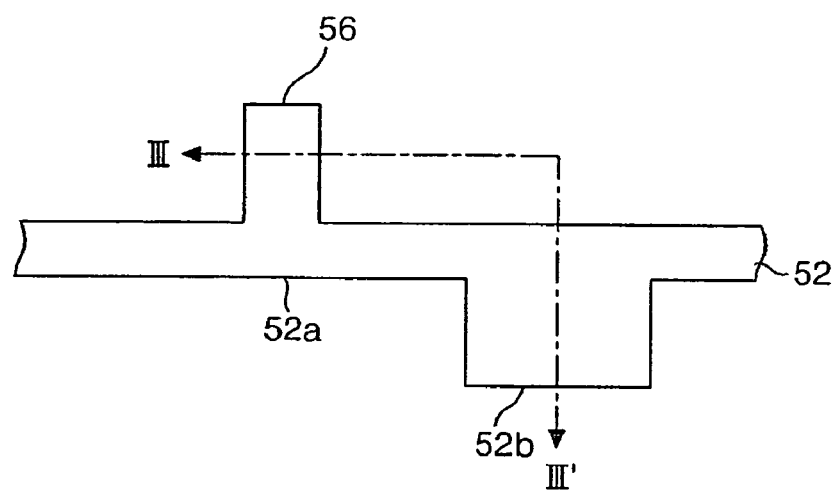
FIGS. 12A to 12E are plan views and sectional views illustrating a fabricating process of the thin film transistor array substrate shown in FIGS. 9 and 10.
Figure 12A:
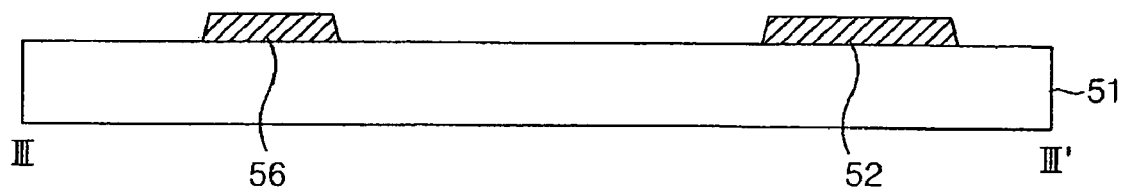

Referring to FIG. 12A, a first conductive pattern group including the gate line 52 and the gate electrode 56 is formed on the lower substrate 51 with a first mask process. More specifically, a gate metal layer is formed on the lower substrate 51 by a deposition technique such as a sputtering method. The gate metal layer is made of a metal such as aluminum (Al), an aluminum alloy, molybdenum (Mo) and copper (Cu). Then, the gate metal layer is patterned by a photolithography process including an etching process, to thereby form the first conductive pattern group including the gate line 52 having the line part 52a and the protrusion 52b and the gate electrode 56.

Figure 12B:
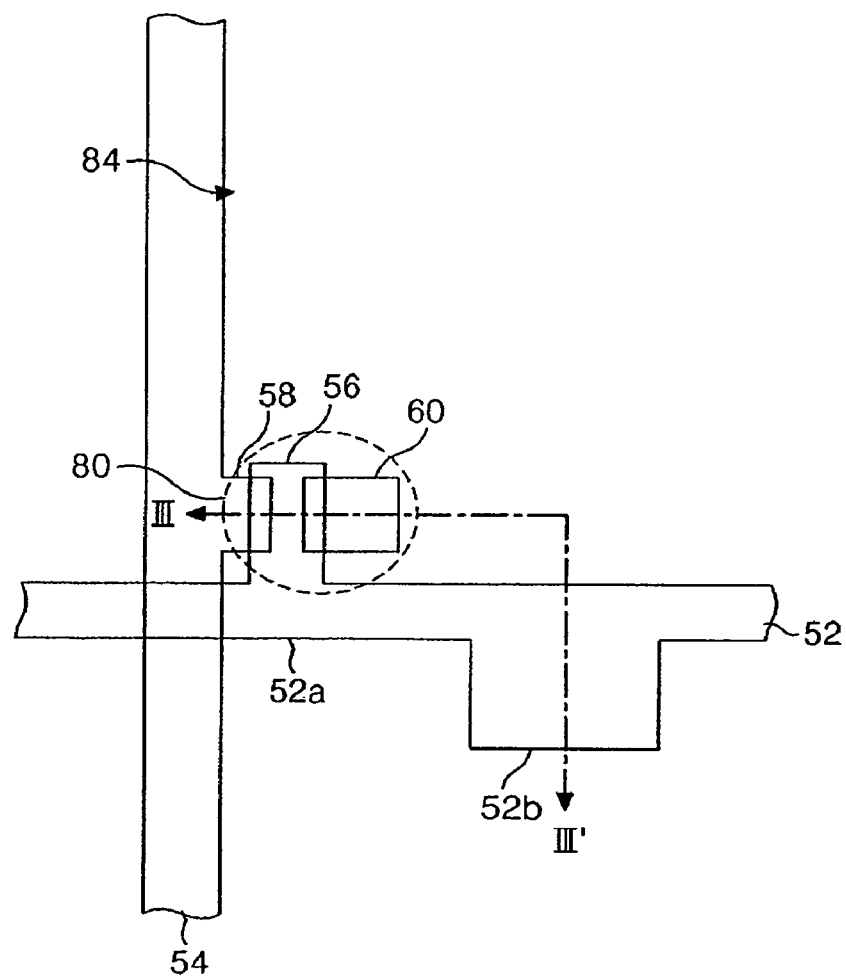
Figure 12B:
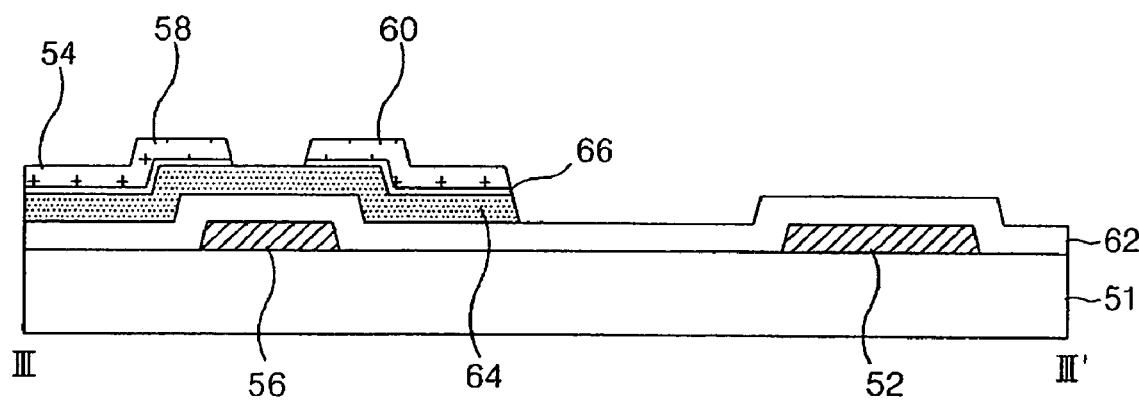

Referring to FIG. 12B, a gate insulating film 62 is formed on the lower substrate 51 having the first conductive pattern group by deposition techniques such as a plasma enhanced chemical vapor deposition (PECVD) method and a sputtering method. The gate insulating film 62 is made of an inorganic insulating material such as silicon oxide ($SiO_x$) or silicon nitride ($SiN_x$).

Further, a semiconductor pattern, which includes an active layer 64 and an ohmic contact layer 66 stacked, and a second conductive pattern, which includes the data line 54, the source electrode 58 and the drain electrode 60, are formed on the gate insulating film 62 with a second mask process. The description on the second mask process will be made later with reference to FIGS. 13A to 13E.

Figure 12C:
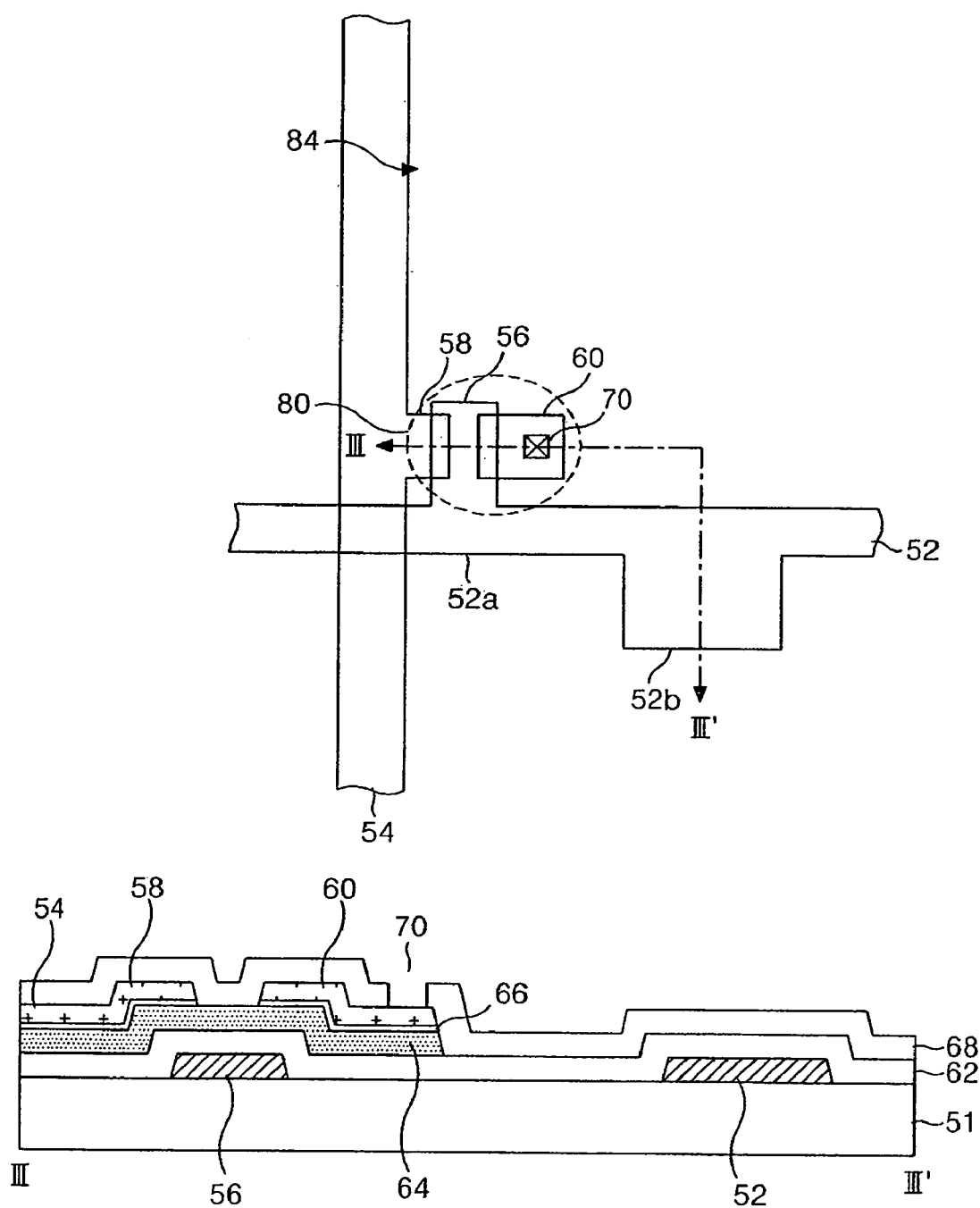

Referring now to FIG. 12C, a passivation film 68 including a contact hole 70 is formed on a lower substrate 51 having the second conductive pattern group with a third mask process. More specifically, the passivation film 68 is formed on the gate insulating film 62. The passivation film 68 is made of an inorganic insulating material such as a material used for the gate insulating film 62 or an organic insulating material having a small dielectric constant such as an acrylic organic compound, BCB (benzocyclobutene) or PFCB (perfluorocyclobutane), etc. Then, the passivation film 68 is patterned by a photolithography process including a dry-etching process, to thereby form the contact hole 70. The contact hole 70 is formed in such a manner to pass through the passivation film 68 to expose the drain electrode 60.

Figure 12D:
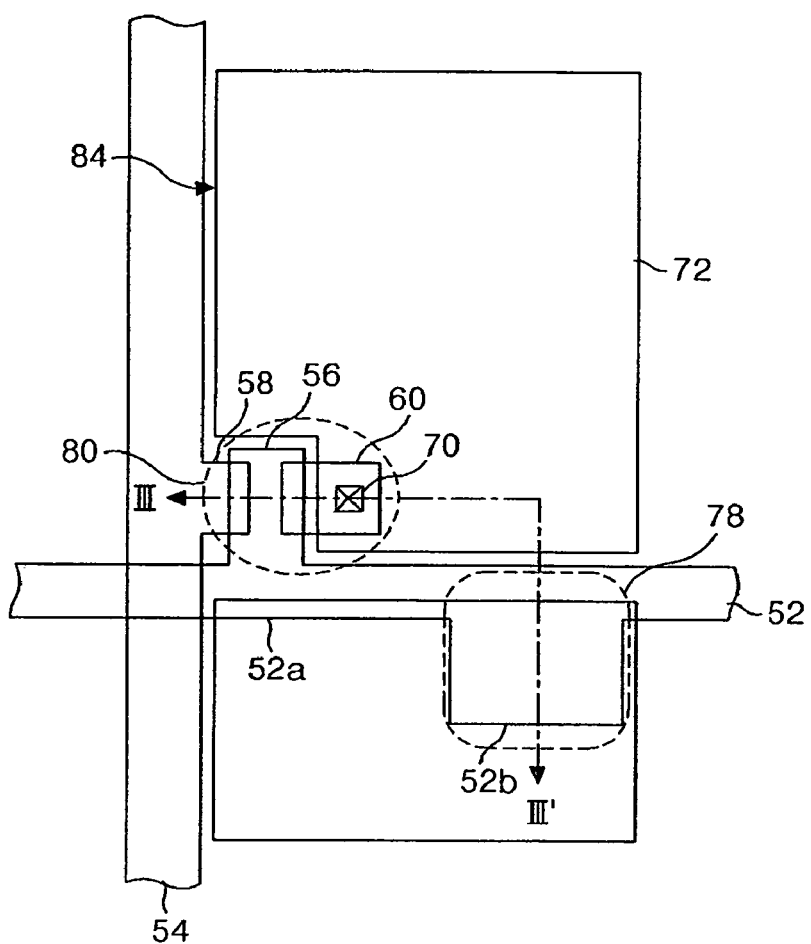
Figure 12D:
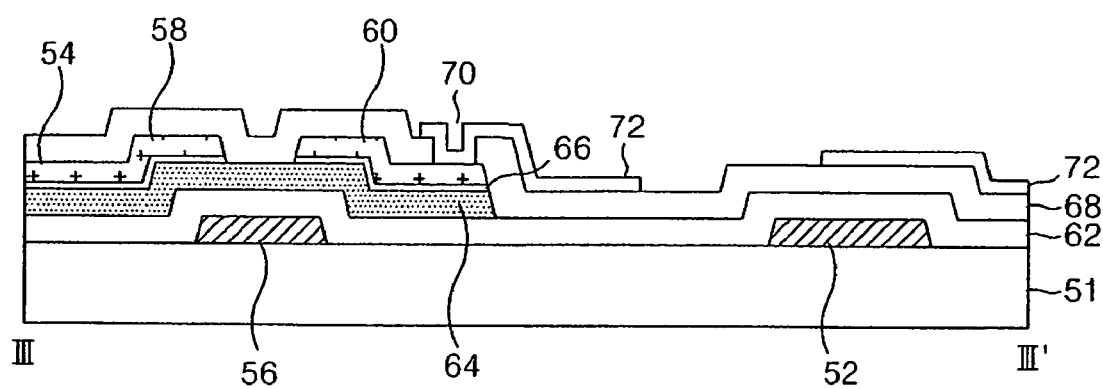

Referring to FIG. 12D, a third conductive pattern group is formed on the lower substrate 51 having the passivation film 68 with a fourth mask process. More specifically, a transparent conductive film is formed on the passivation film 68 by a deposition technique such as a sputtering method. The transparent conductive film may be made of indium-tin-oxide (ITO), tin-oxide (TO), indium-zinc-oxide (IZO) or indium tin zinc oxide (ITZO). The transparent conductive film is then patterned by a photolithography process including a wet-etching process to form the pixel electrode 72. The pixel electrode 72 is connected to the drain electrode 60 via the contact hole 70 and is formed to overlap the protrusion 52b of the gate line 52, with the gate insulating film 62 and the passivation film 68 therebetween.

Figure 12E:
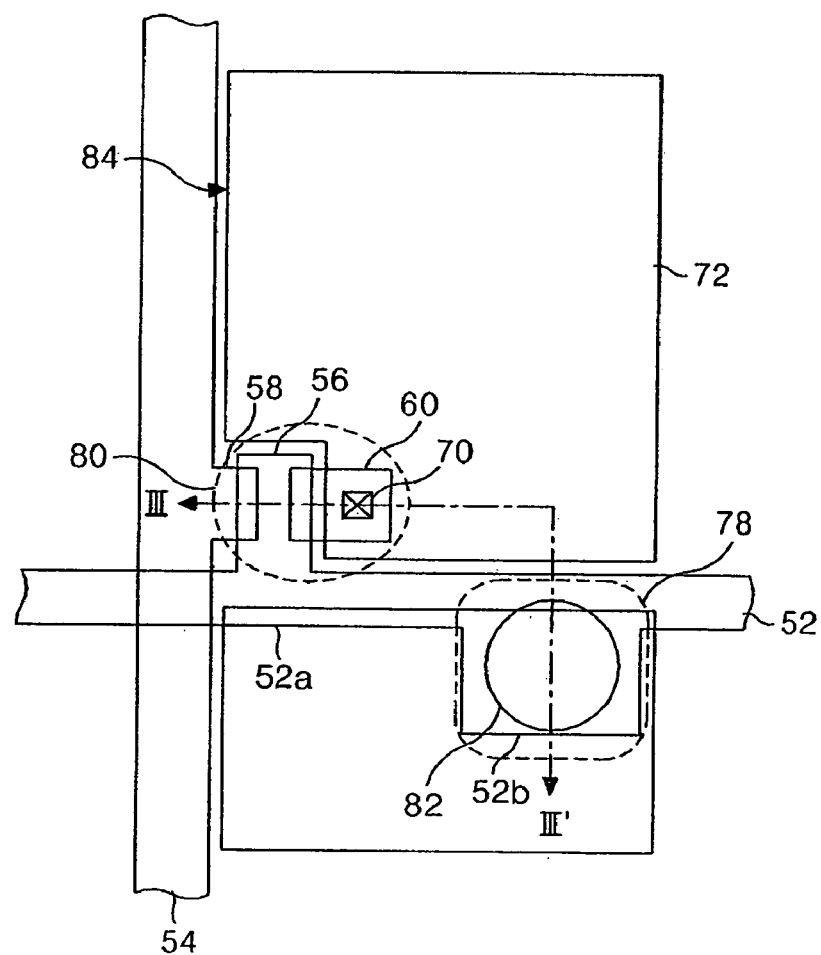
Figure 12E:
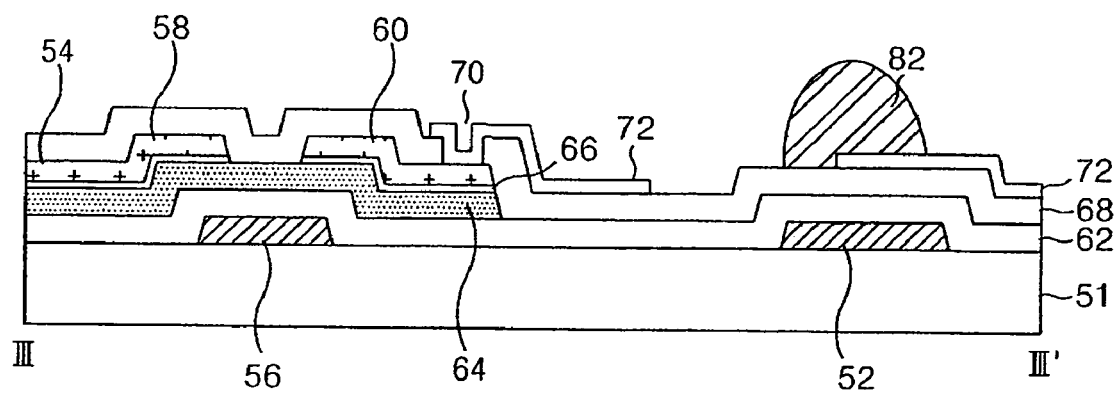

Referring to FIG. 12E, a spacer 82 is formed on the lower substrate 51 having the pixel electrode 72. More specifically, a spacer material is formed by an ink-jet system on the pixel electrode 72 overlapped with the protrusion 52b of the gate line 52. Then, the spacer material is cured by a ultraviolet ray or a firing process, so that the spacer 82 having a predetermined height and width to overlap the protrusion 52b of the gate line 52 is formed.

FIGS. 13A to 13E are plan views and sectional views illustrating a second mask process in the fabricating process of the thin film transistor array substrate.

Figure 13A:
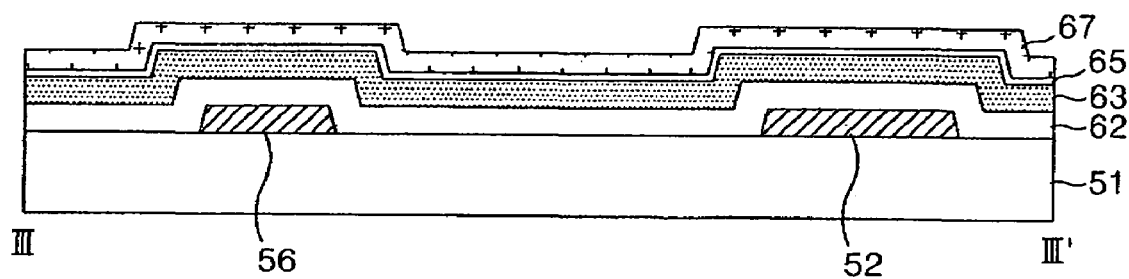
FIGS. 13A to 13E are plan views and sectional views illustrating a second mask process in the fabricating process of the thin film transistor array substrate shown in FIG. 12B.

As shown in FIG. 13A, a first semiconductor layer 63, a second semiconductor layer 65 and a source/drain metal layer 67 are sequentially formed on the gate insulating film 62 by deposition techniques such as a plasma enhanced chemical vapor deposition (PECVD) method and a sputtering method. Herein, the first semiconductor layer 63 is made of amorphous silicon in which an impurity is not doped, and the second conductor layer 65 is made of amorphous silicon in which an impurity of a N-type or P-type is doped. The source/drain metal layer 67 is made of made chrome (Cr), molybdenum (Mo) and copper (Cu).

Figure 13B:
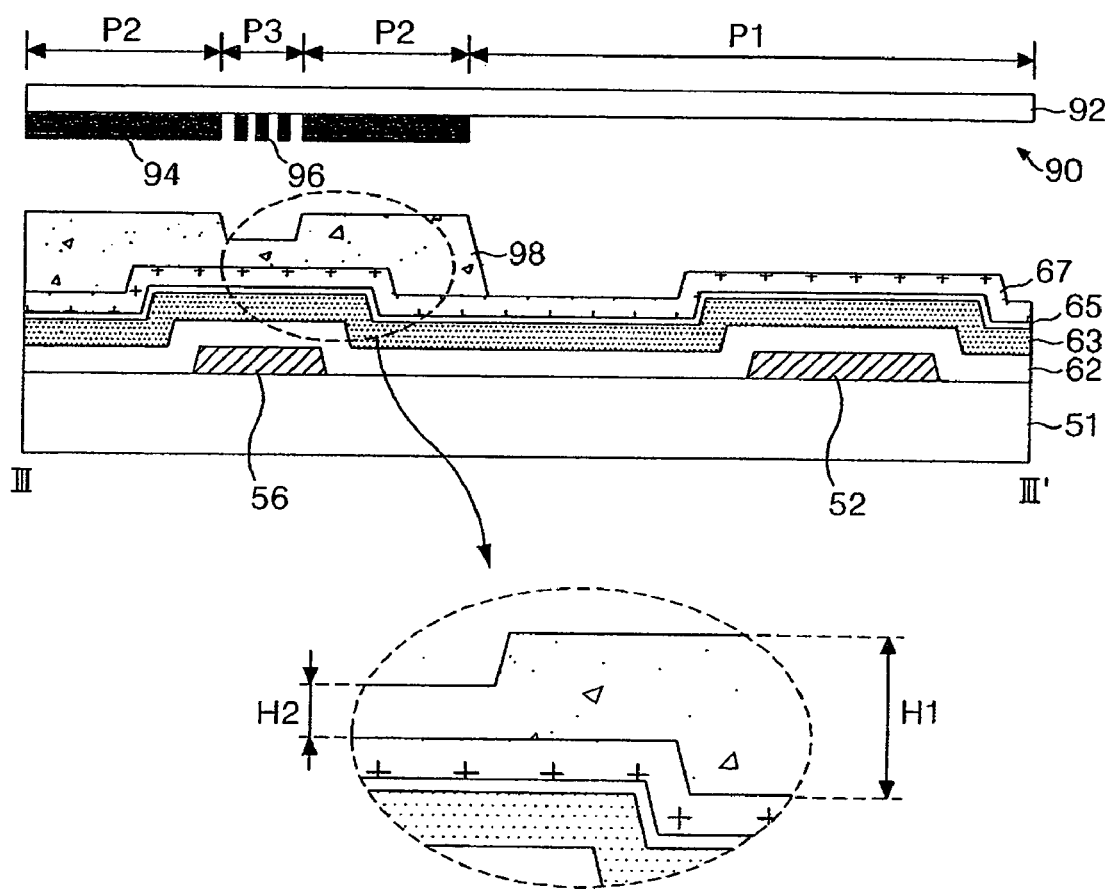

Thereafter, a photo-resist film is formed on the source/drain metal layer 154, and then a second mask 90 is arranged on an upper portion of the lower substrate 51 as shown in FIG. 13B. The second mask 90 has a mask substrate 92, which is of a transparent material, a shielding part 94 formed on a shielding region P2 of the mask substrate 92 and a diffractive exposure part 96 (or a semi-transmitting part) formed on a partial exposure region P3 of the mask substrate 92. Herein, a region in which the mask substrate 92 is exposed becomes an exposure region P1. The photo-resist film is exposed to light using the second mask 90 and then is developed, to thereby form a photo-resist pattern 98 which has a stepped part in the boundary area between the shielding region P2 and the partial exposure region P3 corresponding to the diffractive exposure part 96 and shielding part 94 of the second mask 90, respectively. That is, the photo-resist pattern 98 formed in the partial exposure region P3 has a second height H2 that is lower than a first height H1 of the photo-resist pattern 98 formed in the shielding region P2.

Figure 13C:
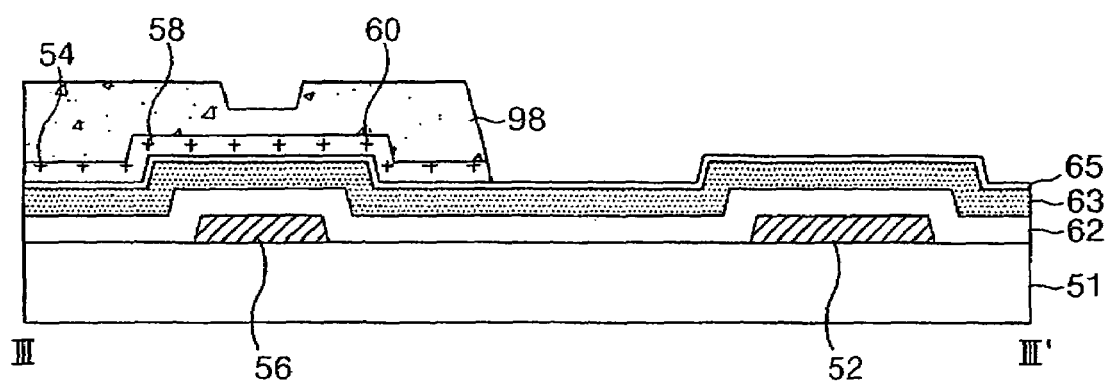

Subsequently, the source/drain metal layer 67 is patterned by a wet etching process using the photo-resist pattern 98 as a mask, so that the second conductive pattern group including the data line 54, the source electrode 58 connected to the data line 54 and the drain electrode 60, which is still connected to the source electrode 58, is formed as shown in FIG. 13C.

Figure 13D:
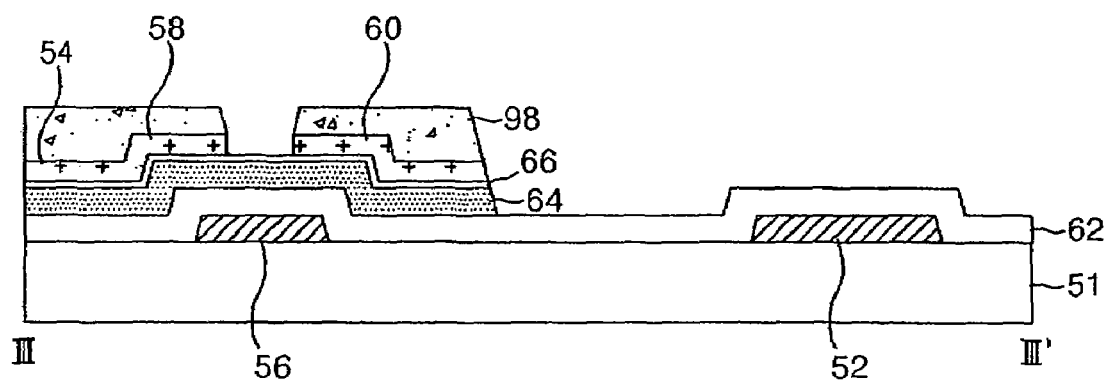

Thereafter, the first semiconductor layer 63 and the second semiconductor layer 65 are patterned by a dry etching process using the photo-resist pattern 98 as a mask, to thereby form the ohmic contact layer 66 and the active layer 64 arranged along the second conductive pattern group as shown in FIG. 13D. Next, the photo-resist pattern 98 formed with the second height H2 in the partial exposure region P3 is removed by an ashing process using an oxygen ($O_2$) plasma, whereby the photo-resist pattern 98 formed with the first height H1 in the shielding region P2 has a lowered height. The partial exposure region P3, that is, the second source/drain metal layer 67 formed at the channel portion of the thin film transistor, are removed by an etching process using the photo-resist pattern 98. Accordingly, the drain electrode 60 is separated from the source electrode 58.

Thereafter, the ohmic contact layer 66 on a channel portion of the thin film transistor is removed by a dry etching process using the photo-resist pattern 98 to thereby expose the active layer 64.

Figure 13E:
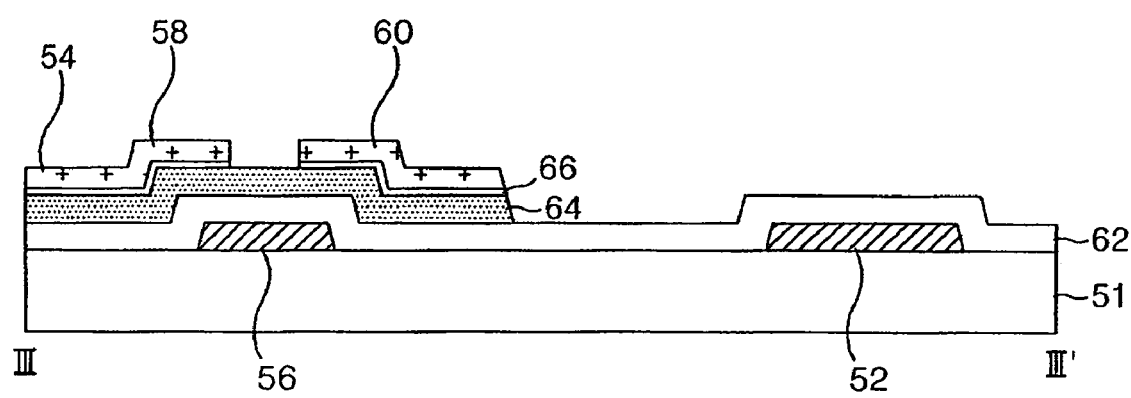

Then, the remainder of the photo-resist pattern 98 left on the second conductive pattern group is removed by a stripping process to complete the second mask process, as shown in FIG. 13E.

Figure 14:
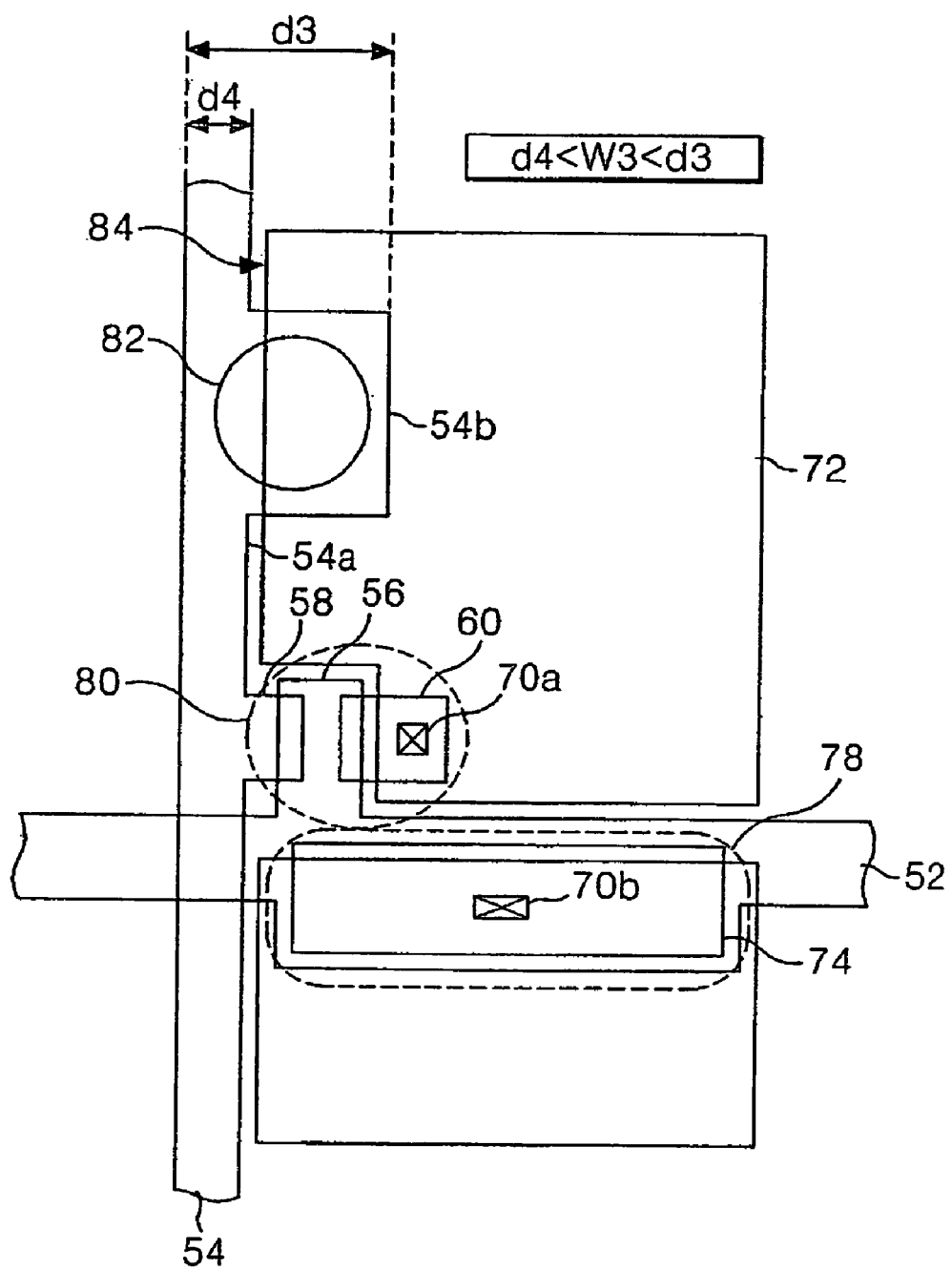
FIG. 14 is a plan view illustrating a thin film transistor array substrate according to a third embodiment of the present invention.

FIG. 14 is a plan view illustrating a thin film transistor array substrate according to a third embodiment of the present invention.

As shown in FIG. 14, the thin film transistor array substrate according to the third embodiment of the present invention includes elements almost identical to the thin film transistor array substrate shown in FIGS. 5 and 6, except for a spacer 82 overlapped with a data line 54. The data line 54 supplies a pixel signal via a drain electrode 60 of a thin film transistor 80 to a pixel electrode 72.

The data line 54 includes a line part 54a defining a pixel region 84 and a protrusion 54b protruded from the line part 54a. The line part 54a is formed to have a width d4 that is narrower than the third width W3 of the data line in the related art, to compensate the decreased aperture ratio of the pixel electrode 72 due to the protrusion 54b. The protrusion 54b has a width d3 wider than the line part 54a in which the spacer 82 is formed by an ink-jet device. According to the third embodiment of the present invention, the protrusion 54b, for example, has a vertical width of about 30 μm-50 μm parallel to the gate line 52 and a horizontal width of about 30 μm-50 μm perpendicular to the gate line 52. The protrusion 54b may have a shape of a rectangular or circle. The width of the protrusion 54 is wider than a width of the spacer 82, which has a circular shape.

The spacer 82 maintains a cell gap between the thin film transistor array substrate and the color filter array substrate. The spacer 82 is formed to have a semi-circle shape or a semi-oval shape at the protrusion region 54b of the data line 54 by an ink-jet device, with the spacer 82 being overlapped with the black matrix (not shown) of the color filter array substrate.

The black matrix of the color filter array substrate is formed to correspond to the gate line (or the data line) of the thin film transistor array substrate according to the first to the third embodiments of the present invention. That is, the black matrix of the color filter array substrate is formed to have a line part and a protrusion in order to overlap the gate line having the line part and the protrusion as in the first and second embodiments or the data line having the line part and the protrusion part as in the third embodiment.

Moreover, as described above, the thin film transistor array substrate according to the first to the third embodiments of the present invention is formed, for example, by a five-round mask process or a four-round mask process. However, it should be understood that a thin film transistor array substrate that is in accord with the principles of the present invention may be formed with various numbers of mask process.

As described above, the thin film transistor array substrate and the fabricating method thereof according to present invention has a protrusion at least one of the data lines and gate lines. A spacer is formed within the protrusion by an ink-jet system. The protrusion overlapped with the spacer has a shape of a circle or rectangular similar to the shape of the spacer. The size of the protrusion is slightly larger than the size of the spacer, and the width of the line part other than the protrusion in the data line or gate line is relatively narrower than the width of the line part in the related art, in order to form the spacer without sacrificing the aperture ratio. Moreover, the size of the data line in the first and second embodiments of the present invention may be the same as the size of the data line in the related art so that implementing a protrusion in the gate line does not increase the resistance of the data line (signal line).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A thin film transistor array substrate comprising:
   a gate line on a substrate;
   a gate insulating film on the gate line;
   a data line on the gate insulating film, the data line crossing the gate line to define a pixel region and the gate insulating film between the gate line and the data line, wherein at least one of the gate line and the data line includes a protrusion extending toward the pixel region and having a shape of a polygon including a rectangle or a circle, and the protrusion has a width ranging from about 30 μm to about 50 μm;
   a thin film transistor at a crossing the gate line and the data line;
   a pixel electrode at the pixel region, the pixel electrode connected to the thin film transistor;
   a spacer within the protrusion dispensed by an ink-jet system; and
   a storage capacitor having the gate line and a storage electrode as storage capacitor electrodes and having the gate insulating film between the storage capacitor electrodes as a dielectric material for the storage capacitor, wherein the storage electrode is electrically connected to the pixel electrode.

2. The thin film transistor array substrate according to claim 1, wherein the spacer has a shape of a semi-circle or a semi-oval.

3. The thin film transistor array substrate according to claim 1, wherein the thin film transistor further includes:
   a gate electrode connected to the gate line;
   a source electrode connected to the data line;
   a drain electrode connected to the pixel electrode; and
   a semiconductor layer forming a channel portion of the thin film transistor.

4. The thin film transistor array substrate according to claim 3, wherein the semiconductor layer is formed below the data line, the source electrode and the drain electrode.

5. A method of fabricating a thin film transistor array substrate, comprising:
   forming a gate line on a substrate;
   forming a gate insulating film on the gate line;
   forming a data line on the gate insulating film, the data line crossing the gate line to define a pixel region and the gate insulating film between the gate line and the data line, wherein at least one of the gate line and the data line includes a protrusion extending toward the pixel region and having a shape of a polygon including a rectangle or a circle, and the protrusion has a width ranging from about 30 μm to about 50 μm;
   forming a thin film transistor at a crossing of the gate line and the data line;
   forming a pixel electrode at the pixel region, the pixel electrode connected to the thin film transistor;
   forming a spacer within the protrusion by an ink-jet system; and
   forming a storage capacitor having the gate line and a storage electrode as storage capacitor electrodes and having the gate insulating film between the storage capacitor electrodes as a dielectric material for the storage capacitor, wherein the storage electrode is electrically connected to the pixel electrode.

6. The method according to claim 5, further comprising bonding a upper substrate to the substrate, wherein the upper substrate has a black matrix.

7. The method according to claim 6, wherein the black matrix overlaps the spacer in the protrusion.

8. The method according to claim 5, wherein the spacer maintains a cell gap between the upper and lower substrates.

9. The method according to claim 5, wherein the spacer overlaps the storage capacitor.

* * * * *